US008863459B2

(12) United States Patent
Holt

(10) Patent No.: US 8,863,459 B2
(45) Date of Patent: Oct. 21, 2014

(54) ATTACHMENT MEMBER FOR INSULATION PANEL

(75) Inventor: John Timothy Holt, Summerville, SC (US)

(73) Assignee: Progressive Foam Technologies, Inc., Beach City, OH (US)

( * ) Notice: Subject to any disclaimer, the term of this patent is extended or adjusted under 35 U.S.C. 154(b) by 21 days.

(21) Appl. No.: 13/570,892

(22) Filed: Aug. 9, 2012

(65) Prior Publication Data

US 2013/0036699 A1 Feb. 14, 2013

Related U.S. Application Data

(60) Provisional application No. 61/523,084, filed on Aug. 12, 2011, provisional application No. 61/569,382, filed on Dec. 12, 2011, provisional application No. 61/569,396, filed on Dec. 12, 2011.

(51) Int. Cl.
| | | |
|---|---|---|
| *E04B 1/38* | (2006.01) | |
| *E04C 1/40* | (2006.01) | |
| *E04D 3/35* | (2006.01) | |
| *E04B 1/76* | (2006.01) | |
| *E04F 13/08* | (2006.01) | |

(52) U.S. Cl.
CPC .............. *E04B 1/7629* (2013.01); *E04D 3/355* (2013.01); *E04F 13/0864* (2013.01); *E04F 13/0878* (2013.01); *E04D 3/351* (2013.01); *E04F 13/0876* (2013.01); *E04F 13/0803* (2013.01)
USPC ................. 52/509; 52/510; 52/512; 52/309.4

(58) Field of Classification Search
CPC ....... E04F 13/12; E04F 13/14; E04F 13/0803; E04F 13/083; E04B 1/4178

USPC ........ 52/302.1, 309.4, 506.01, 509, 510, 512, 52/513, 309.7, 800.1, 802.1; 403/336
See application file for complete search history.

(56) References Cited

U.S. PATENT DOCUMENTS

| | | | | |
|---|---|---|---|---|
| 3,181,662 | A | * | 5/1965 | Maertzig, Jr. ................... 52/509 |
| 3,226,900 | A | * | 1/1966 | Blomqvist ....................... 52/508 |
| 3,501,883 | A | * | 3/1970 | Birum, Jr. ....................... 52/241 |
| 4,479,339 | A | * | 10/1984 | Kroh ............................... 52/468 |
| 4,731,972 | A | | 3/1988 | Anderson |
| 5,072,569 | A | * | 12/1991 | VanTassel .................... 52/745.1 |
| 5,715,638 | A | | 2/1998 | Anderson, Sr. |
| 2002/0023398 | A1 | * | 2/2002 | Ito ................................. 52/220.1 |
| 2005/0150183 | A1 | | 7/2005 | Hettler et al. |
| 2006/0179762 | A1 | * | 8/2006 | Thome et al. .............. 52/506.01 |
| 2006/0236653 | A1 | | 10/2006 | Showers |
| 2007/0011967 | A1 | * | 1/2007 | Frazer ........................... 52/309.4 |
| 2009/0094923 | A1 | | 4/2009 | Weir et al. |
| 2010/0263316 | A1 | * | 10/2010 | Bruneau ......................... 52/546 |
| 2013/0269277 | A1 | * | 10/2013 | Chauncey .................. 52/506.05 |

FOREIGN PATENT DOCUMENTS

EP 544953 A1 * 6/1993 ................ E04B 1/41

\* cited by examiner

*Primary Examiner* — Brian Glessner
*Assistant Examiner* — Brian D Mattei
(74) *Attorney, Agent, or Firm* — Richard M. Klein; Fay Sharpe LLP

(57) ABSTRACT

Attachment members are disclosed for use with an insulation panel or composite siding panel. The attachment member includes a male connecting member, a hem portion, and a connection portion joining the male connecting member and the hem portion. The male connecting member extends into the body of a foam insulating layer along a first end edge. The attachment member and the first end edge cooperate to be complementary in shape with the second end edge such that adjacent panels can engage each other.

15 Claims, 18 Drawing Sheets

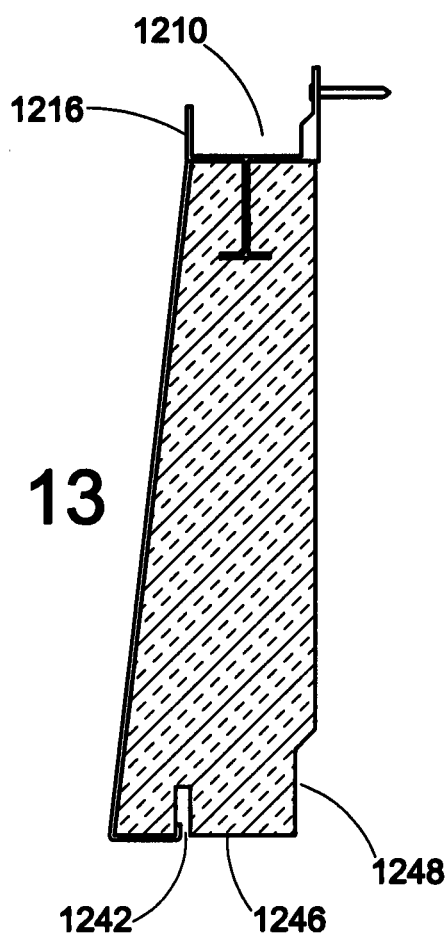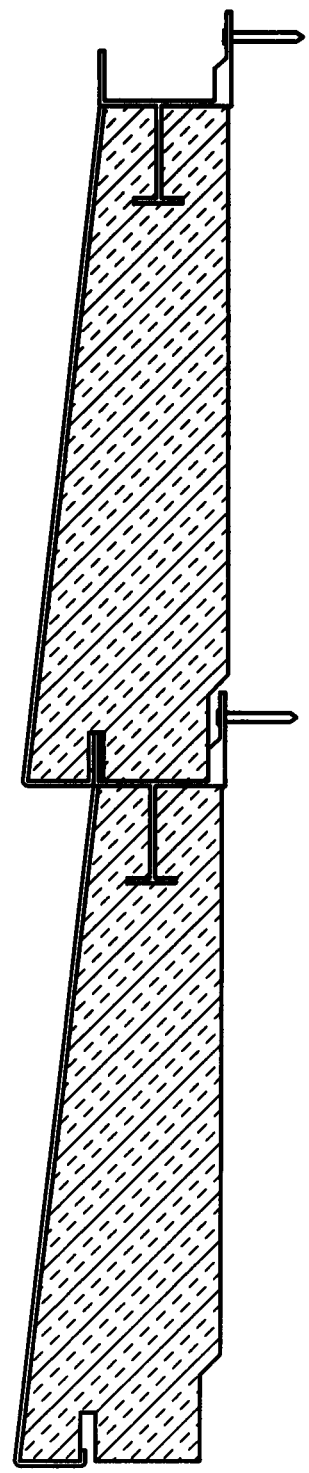

ATTACHMENT MEMBER FOR INSULATION PANEL

This application claims priority to U.S. Provisional Patent Application Ser. No. 61/523,084, filed on Aug. 12, 2011; to U.S. Provisional Patent Application Ser. No. 61/569,382, filed on Dec. 12, 2011; and to U.S. Provisional Patent Application Ser. No. 61/569,396, filed on Dec. 12, 2011. The disclosures of these three applications are hereby fully incorporated by reference in their entirety.

BACKGROUND

The present disclosure relates to attachment members and insulation panels including the same. The insulation panels may be used on the exterior surface of a roofed and walled structure built for permanent use, including a building, a house, etc.

In a building structure, such as a house, a frame is typically built out of wood, steel, block, or similar material. An exterior wall of plywood or material of similar function is then placed upon the frame to provide an exterior surface. A weather-proofing layer may cover the exterior wall. An insulation layer can then be placed, and finally a cladding, paneling, sheathing, veneer, or siding is placed to provide the final exterior view.

Vinyl siding is a popular substitute for wood paneling and aluminum siding. It is easily cleaned, and it is resistant to deterioration. It may also be easily installed around windows and doors. Moreover, it may be produced in a variety of shapes and colors by known extrusion and molding processes at a relatively low cost per sheet or panel. To enhance the thermal insulation of building structures, one or more layer of insulating material can be placed between the vinyl siding and the exterior wall of the building. For example, a layer of insulation can be attached to an exterior wall, and the vinyl siding then installed over the insulating layer. In other insulated siding systems, an insulated panel is generally attached to a veneer, such as vinyl siding panel.

It would be desirable to produce additional insulated siding panel systems or assemblies, as well as components thereof, that allow for simple production, easy installation, and greater insulating properties.

BRIEF DESCRIPTION

The present application discloses, in various exemplary embodiments, various installation/attachment members that can be used to form an insulation panel or composite siding panel. The insulation panels are particularly useful on the exterior surfaces or walls of a building. The insulation panels include foam insulation, which provides strength, enables a wide variety of design options, and provides increased R-values.

Disclosed in embodiments is an insulation panel comprising a foam insulating layer and an attachment member. The foam insulating layer includes a front face, a rear face, a first end edge, a second end edge, and a female connecting member extending into a body of the foam insulating layer along the first end edge. The attachment member includes a male connecting member extending into the female connecting member of the foam insulating layer, a hem portion substantially aligned with the rear surface of the foam insulating layer, and a connection portion joining the male connecting member and the hem portion. The attachment member and the first end edge cooperate to be complementary in shape with the second end edge such that adjacent panels can engage each other.

The male connecting member and the hem portion may be substantially parallel to each other.

The attachment member may further include an anchor portion extending from the male connecting member. The anchor portion may be substantially parallel to the connection portion. The connection portion may be connected to a first end of the male portion and the anchor portion may be connected to a second end of the male portion.

The male portion may include a first end and a second end. The anchor portion may be located between the first end and the second end.

The foam insulating layer may further include a tongue extending from the first end edge and a groove extending into the second end edge.

The attachment member may further include a forward wall connected to the connection member and extending away from the foam insulating layer. The foam insulating layer may further include a groove extending from the second end edge into the body. The forward wall and the grove may be complementary in shape.

The insulation panel may include a veneer panel attached to the front face of the foam insulating layer. The veneer panel may have a first end edge and a second end edge. The veneer panel may include a first wall extending transversely rearward from the first end edge and a second wall extending transversely rearward from the second end edge.

The first wall may extend from the first end edge of the veneer panel beyond the first end edge of the foam insulating layer. The second wall may extend transversely rearward from the second end edge.

The insulation panel may include a pocket between the second wall of the veneer panel and the second end edge of the foam insulating layer.

The veneer panel may include a channel along a second end edge. The second end edge of the foam insulating layer may include a forward segment extending into the channel.

The veneer panel may be formed from vinyl, polypropylene, a fiber-cement material, aluminum, steel, a wood-plastic composite, a cementitious coating, wood, or combinations thereof.

The foam insulating layer may be formed from a polystyrene, polyurethane, polyisocyanurate, polyethylene, polypropylene, or combinations thereof.

The front face of the foam insulating layer may be angled with respect to the rear face of the foam insulating layer.

The second end edge of the foam insulating layer may be thicker than the first end edge of the foam insulating layer.

The front face of the foam insulating layer may be substantially parallel to the rear face of the foam insulating layer.

Also disclosed in embodiments is an insulation panel comprising a foam insulating layer, an attachment member, and a veneer panel. The foam insulating layer includes a front face, a rear face, a first end edge, a second end edge, and a female connecting member extending into a body of the foam insulating layer along the first end edge. The attachment member includes a male connecting member extending into the female connecting member of the foam insulating layer, a hem portion substantially aligned with the rear face of the foam insulating layer, an anchor portion extending from a free end of the male connecting member, and a connection portion joining the male connecting member and the hem portion. The veneer panel is attached to the front face of the foam insulating layer. The attachment member and the first end edge are complementary to the second end edge.

The attachment member may further include a forward wall. The forward wall, connection portion, and hem portion cooperate to form a shape complementary to the second end edge.

Further disclosed in embodiments is an attachment member comprising a main portion, a nailing hem, and a lower leg. The main portion has a forward edge and a rear edge. The nailing hem extends transversely from the rear edge of the main portion in an upper direction. The lower leg extends transversely from the main portion in a lower direction.

The lower leg may connect to the main portion along the forward edge.

The attachment member may further include a forward wall extending from the forward edge of the main portion in the upper direction.

The lower leg, the forward wall, and the nailing hem may be substantially parallel to each other.

The lower leg and the nailing hem may be substantially parallel to each other and extend substantially perpendicularly from the main portion.

The lower leg may connect to the main portion at a central location.

The attachment member may further include a forward wall extending from the forward edge of the main portion in the upper direction.

The lower leg, forward wall, and nailing hem may be substantially parallel to each other.

The forward wall may have a first end and a second end. The second end of the forward wall may be connected to the main portion. A lip may extend transversely from the first end of the forward wall in a forward direction away from the nailing hem.

The attachment member may further include a flange extending transversely from the lower leg. The lower leg may have a first end and a second end. The first end of the lower leg may be connected to the main portion. The flange may extend from the second end of the lower leg.

The main portion and the flange may be substantially parallel to each other.

A base of the nailing hem connecting to the main portion may be thicker than an apex of the nailing hem.

A base of the nailing hem may further comprise a spur extending transversely in the lower direction.

The attachment member may further include a forward wall extending from the forward edge of the main portion in the upper direction.

The lower leg, forward wall, and nailing hem may be substantially parallel to each other and extend substantially perpendicularly from the main portion.

The nailing hem may be longer than the forward wall.

Still further disclosed is an attachment member comprising a main portion, a nailing hem, a forward wall, and a lower leg. The main portion may have a forward edge and a rear edge. The nailing hem may extend perpendicularly from the rear edge of the main portion in an upper direction. The forward wall may extend perpendicularly from the forward edge of the main portion in the upper direction. The lower leg extending perpendicularly from the forward edge of the main portion in a lower direction.

Yet further disclosed is an attachment member comprising a main portion, a nailing hem, and a lower leg. The main portion may have a forward edge and a rear edge. The nailing hem may extend perpendicularly from the rear edge of the main portion in an upper direction. The lower leg may extend perpendicularly from the main portion in a lower direction at a point between the forward edge and the rear edge.

The attachment member may further include a forward wall extending perpendicularly from the forward edge of the main portion in the upper direction.

The point may be the midpoint of the main portion.

Also disclosed is an attachment member comprising a main portion, a nailing hem, a forward wall, a lower leg, and a flange. The main portion has a forward edge and a rear edge. The nailing hem extends perpendicularly from the rear edge of the main portion in an upper direction. The forward wall extends perpendicularly from the forward edge of the main portion in the upper direction. The lower leg has an upper end and a lower end. The lower leg extends perpendicularly from the main portion in a lower direction at a point between the forward edge and the rear edge and the upper end connects to the main portion. The flange extending perpendicularly from the lower end of the lower leg.

A base of the nailing hem connecting to the main portion may be thicker than an apex of the nailing hem.

Still further disclosed is an attachment member comprising a main portion, a nailing hem, a forward wall, a lower leg, at least one spur, and a flange. The main portion has a forward edge and a rear edge. The nailing hem extends perpendicularly from the rear edge of the main portion in an upper direction. The forward wall extends perpendicularly from the forward edge of the main portion in the upper direction. The lower leg has an upper end and a lower end, and extends perpendicularly from the main portion in a lower direction. The upper end of the lower leg is connected to the main portion. The at least one spur extends transversely from the nailing hem in the lower direction and in a forward direction. The flange extends perpendicularly from the lower end of the lower leg.

Yet further disclosed is an insulation panel comprising a foam insulating layer and an attachment member. The foam insulating layer includes a front face, a rear face, a first end edge, and a second end edge that define a body of the foam insulating layer. The attachment member includes a main portion, a nailing hem, a forward wall, and a lower leg. The main body portion has a forward edge and a rear edge. The nailing hem extends transversely from the rear edge of the main portion in an upper direction. The forward wall extends transversely from the forward edge of the main portion in the upper direction. The lower leg extends transversely from the forward edge of the main portion in a lower direction. The lower leg of the attachment member extends into the body of the foam insulating layer along the first end edge. The attachment member and the first end edge cooperate to be complementary in shape with the second end edge such that adjacent panels can engage each other.

The insulation panel may further include a veneer panel attached to the front face of the foam insulating layer.

The veneer panel may have a second wall that extends rearward along the second end edge of the foam insulating layer.

The veneer panel may have a first wall that extends rearward and is at the height of an upper edge of the forward wall.

The first end edge of the foam insulating layer may include a tongue and the second end edge of the foam insulating layer includes a groove. The tongue is shaped to fit within the groove.

The foam insulating layer may further include a recess in the rear face that is shaped to accommodate the nailing hem.

Also disclosed is an insulation panel comprising a foam insulating layer and an attachment member. The foam insulating layer includes a front face, a rear face, a first end edge, and a second end edge that define a body of the foam insulating layer. The attachment member includes a main portion, a nailing hem, a forward wall, and a lower leg. The main portion has a forward edge and a rear edge. The nailing hem extends transversely from the rear edge of the main portion in an upper direction. The forward wall extends transversely from the forward edge of the main portion in the upper direction. The lower leg extends transversely from the main portion in a lower direction at a point between the forward edge and the rear edge. The lower leg of the attachment member extends into the body of the foam insulating layer along the first end edge. The attachment member and the first end edge cooperate to be complementary in shape with the second end edge such that adjacent panels can engage each other.

The insulation panel may further include a veneer panel attached to the front face of the foam insulating layer. The veneer panel may have a first end edge adjacent the first end edge of the foam insulating layer and a second end edge. The veneer panel may further include a first wall that extends transversely upward from the first end edge of the veneer panel beyond the first end edge of the foam insulating layer and a second wall that extends transversely rearward from the second end edge of the veneer panel.

The foam insulating layer may further include a rear segment extending from the second end edge of the foam insulating layer along the rear face. The rear segment may be complementary to a channel formed by the first wall of the veneer panel and the attachment member.

The second end edge of the veneer panel may extend beyond the second end edge of the foam insulating layer. A pocket may be formed between the rear segment of the foam insulating layer, the second end edge of the foam insulating layer, and the second wall of the veneer panel.

The second end edge of the veneer panel may extend beyond the second end edge of the foam insulating layer, and the veneer panel may further include a second wall that extends transversely rearward from the second end edge of the veneer panel.

The foam insulating layer may further include a recess in the rear face. The recess is shaped to accommodate the nailing hem.

Still further disclosed is an insulation panel comprising a foam insulating layer and an attachment member. The foam insulating layer includes a front face, a rear face, a first end edge, and a second end edge that define a body of the foam insulating layer. The attachment member includes a main portion, a nailing hem, a forward wall, a lower leg, and a flange. The main portion has a forward edge and a rear edge. The nailing hem extends transversely from the rear edge of the main portion in an upper direction. The forward wall extends transversely from the forward edge of the main portion in the upper direction. The lower leg has an upper end and a lower end. The lower leg extends transversely from the main portion in a lower direction at a point between the forward edge and the rear edge. The flange extends transversely from the lower end of the lower leg. The lower leg and the flange of the attachment member are embedded in the body of the foam insulating layer along the first end edge. The attachment member and the first end edge cooperate to be complementary in shape with the second end edge such that adjacent panels can engage each other.

The insulation panel may further include a veneer panel attached to the front face of the foam insulating layer. The veneer panel has a first end edge adjacent the first end edge of the foam insulating layer and a second end edge.

The veneer panel may further include a first wall that extends transversely upward from the first end edge of the veneer panel beyond the first end edge of the foam insulating layer and is adjacent to the forward wall of the attachment member.

The veneer panel may further include a channel along the second end edge. The second end edge of the foam insulating layer may include a groove that forms a front ridge and a rear ridge in the second end edge. The front ridge of the foam insulating layer enters the channel of the veneer panel.

The first end edge of the foam insulating layer is planar from the front face to the rear face.

The rear face of the foam insulating layer may include a recess shaped to accommodate the nailing hem of the attachment member.

A base of the nailing hem connecting to the main portion may thicker than an apex of the nailing hem.

A length of the second end edge of the foam insulating layer may be greater than a length of the first end edge of the foam insulating layer.

A thickness of the foam insulating layer between the front face and the rear face may be generally constant from the first end edge to the second end edge.

The second end edge of the foam insulating layer may comprise a groove complementary to the forward wall of the attachment member. The groove may be located along the front face of the foam insulating layer.

Yet further disclosed is an insulation panel comprising a foam insulating layer and an attachment member. The foam insulating layer includes a front face, a rear face, a first end edge, and a second end edge that define a body of the foam insulating layer. The attachment member includes a main portion, a nailing hem, a forward wall, a lower leg, and at least one spur. The main portion has a forward edge and a rear edge. The nailing hem extends transversely from the rear edge of the main portion in an upper direction. The forward wall extends transversely from the forward edge of the main portion in the upper direction. The lower leg extends transversely from the forward edge of the main portion in a lower direction. The at least one spur extends transversely from the nailing hem in the lower direction and in a forward direction. The lower leg of the attachment member extends into the body of the foam insulating layer along the first end edge. The attachment member and the first end edge cooperate to be complementary in shape with the second end edge such that adjacent panels can engage each other.

The first end edge of the foam insulating layer may be planar from the front face to the rear face.

The rear face of the foam insulating layer may include a recess shaped to accommodate the nailing hem of the attachment member.

A thickness of the foam insulating layer between the front face and the rear face may be generally constant from the first end edge to the second end edge.

The second end edge of the foam insulating layer may comprise a groove complementary to the forward wall of the attachment member. The groove may be located along the front face of the foam insulating layer.

The first end edge of the foam insulating layer may be substantially perpendicular to the front face and the rear face of the foam insulating layer.

The forward wall of the attachment member may be substantially parallel with the front face of the foam insulating layer.

The insulation may further comprise a veneer panel attached to the front face of the foam insulating layer.

Also disclosed in embodiments is an insulation panel comprising a foam insulating layer and an attachment member.

The attachment member includes a main portion, a nailing hem, a forward wall, and a lower leg. The main portion has a forward edge and a rear edge. The nailing hem extends transversely from the rear edge of the main portion in an upper direction. The forward wall extends transversely from the forward edge of the main portion in the upper direction. The lower leg extends transversely from the main portion in a lower direction. The foam insulating layer comprises a front face, a rear face, a first end edge, and a second end edge that define a body of the foam insulating layer. The front face is angled with respect to the rear face. A groove in the second end edge forms a front ridge and a rear ridge in the second end edge. The lower leg of the attachment member extends into the body of the foam insulating layer along the first end edge, the attachment member and the first end edge cooperating to be complementary in shape with the second end edge such that adjacent panels can engage each other.

The insulation panel may further comprise a veneer panel attached to the front face of the foam insulating layer. The veneer panel comprises a front face, a rear face, a first end edge, and a second end edge. The first end edge of the veneer panel is adjacent to an upper edge of the forward wall of the attachment member.

The veneer panel can further comprise a lower wall extending rearwards from the second end edge, the lower wall running adjacent to the front ridge of the foam insulating layer. The lower wall of the veneer panel may be part of a channel, the front ridge of the foam insulating layer entering the channel. The forward wall of the attachment member is angled to be parallel with the front face of the foam insulating layer.

The attachment member may further comprise a flange extending transversely from a lower end of the lower leg.

The attachment member may further comprise a lip extending transversely from an upper edge of the forward wall in a forward direction.

The base of the nailing hem may further comprise a spur extending in a forward direction. The spur sometimes also extends in a lower direction.

The rear face of the foam insulating layer may include a recess that is shaped to accommodate the nailing hem of the attachment member.

Also disclosed is an insulation panel comprising an attachment member, a foam insulating layer, and a veneer panel. The foam insulating layer comprises a front face, a rear face, a first end edge, and a second end edge that define a body of the foam insulating layer. The attachment member comprises a main portion resting upon the first end edge of the foam insulating layer, a forward wall extending transversely from a forward edge of the main portion away from the foam insulating layer, and a lower leg extending transversely from the main portion into the body of the foam insulating layer. The veneer panel is attached to the front face of the foam insulating layer, a first end edge of the veneer panel being adjacent to an upper edge of the forward wall of the attachment member.

Also described in various embodiments is an attachment member comprising a main portion, a nailing hem, a lower leg, and at least one flange. The main portion has a forward edge and a rear edge. The nailing hem extends transversely from the rear edge of the main portion in an upper direction. The lower leg extends transversely from the main portion in a lower direction. The at least one flange extends transversely from the lower leg, with each flange having a stop surface and an angled surface that extends away from the main portion.

The lower leg may connect to the main portion along the forward edge. Alternatively, the lower leg can connect to the main portion in a central location.

The attachment member may further comprise a forward wall extending from the forward edge of the main portion in the upper direction. The nailing hem can be longer than the forward wall. The lower leg, the forward wall, and the nailing hem may be substantially parallel to each other. An optional lip may extend transversely from an upper end of the forward wall in a forward direction away from the nailing hem. The lip may be substantially parallel to the main portion.

The lower leg and the nailing hem may be substantially parallel to each other and extend substantially perpendicularly from the main portion.

A base of the nailing hem connecting to the main portion can be thicker than an apex of the nailing hem. In some embodiments, the base of the nailing hem further comprises at least one spur extending transversely in a forward direction. The spur can also extend transversely in the lower direction.

An angle $\omega$ between the stop surface and the angled surface of the flange may be acute. In embodiments, the angle $\omega$ is from about 15° to about 75°.

The stop surface of the flange may be substantially parallel to a lower surface of the main portion. The lower end of the lower leg can also be pointed.

In particular embodiments, a plurality of flanges are spaced along the lower leg. The stop surfaces of the plurality of flanges may have the same length.

The plurality of flanges can include a primary flange and a secondary flange, the primary flange being located closer to the lower end of the lower leg, wherein the secondary flange is longer than the primary flange. The plurality of flanges can also include a tertiary flange located closer to the main portion than the secondary flange, wherein the tertiary flange is longer than the secondary flange.

Also disclosed in embodiments is an insulation panel comprising a foam insulating layer and an attachment member. The foam insulating layer comprises a front face, a rear face, a first end edge, and a second end edge that define a body of the foam insulating layer. The attachment member comprises a main portion, a nailing hem, a lower leg, and at least one flange. The main portion has a forward edge and a rear edge. The nailing hem extends transversely from the rear edge of the main portion in an upper direction. The lower leg extends transversely from the main portion in a lower direction. The at least one flange extends transversely from the lower leg, with each flange having a stop surface and an angled surface that extends away from the main portion. The lower leg of the attachment member extends into the body of the foam insulating layer along the first end edge, the attachment member and the first end edge cooperating to be complementary in shape with the second end edge such that adjacent panels can engage each other.

The insulation panel may further comprise a veneer panel attached to the front face of the foam insulating layer. The first end edge of the foam insulating layer may include a tongue, with the second end edge of the foam insulating layer including a groove, and the tongue being shaped to fit within the groove. The foam insulating layer may further comprise a recess in the rear face that is shaped to accommodate the nailing hem. The second end edge of the foam insulating layer may include a groove that forms a front ridge and a rear ridge in the second end edge. The first end edge of the foam insulating layer may be planar from the front face to the rear face.

The front face of the foam insulating layer may be angled with respect to the rear face. Alternatively, a thickness of the second end edge of the foam insulating layer may be greater than a thickness of the first end edge of the foam insulating layer. Sometimes, a thickness of the foam insulating layer between the front face and the rear face is generally constant from the first end edge to the second end edge.

Also described in other embodiments is an attachment member comprising a main portion, a nailing hem, a lower leg, a primary flange, and a secondary flange. The main portion has a forward edge and a rear edge. The nailing hem extends transversely from the rear edge of the main portion in an upper direction. The lower leg extends transversely from the main portion in a lower direction. The primary flange and the secondary flange each extend transversely from the lower leg, with the primary flange being located along the lower leg further from the main portion than the secondary flange. The secondary flange is longer than the primary flange.

The primary flange and the secondary flange may each have a stop surface and an angled surface that extends away from the main portion. The stop surface of each flange may be substantially parallel to a lower surface of the main portion. An angle ω between the stop surface and the angled surface of the flange may be acute. In embodiments, the angle ω is from about 15° to about 75°.

The attachment member may further comprise a tertiary flange located closer to the main portion than the secondary flange, wherein the tertiary flange is longer than the secondary flange. The primary flange, the secondary flange, and the tertiary flange may each have a stop surface and an angled surface that extends away from the main portion. The stop surface of each flange may be substantially parallel to a lower surface of the main portion. An angle ω between the stop surface and the angled surface of the flange may be acute. In embodiments, the angle ω is from about 15° to about 75°.

The lower leg may connect to the main portion along the forward edge. Alternatively, the lower leg may connect to the main portion in a central location. The lower end of the lower leg may be pointed.

The attachment member may further comprise a forward wall extending from the forward edge of the main portion in the upper direction. The nailing hem may be longer than the forward wall. The lower leg, the forward wall, and the nailing hem may be substantially parallel to each other. An optional lip may extend transversely from an upper end of the forward wall in a forward direction away from the nailing hem. The lip can be substantially parallel to the main portion.

The lower leg and the nailing hem may be substantially parallel to each other and extend substantially perpendicularly from the main portion.

A base of the nailing hem connecting to the main portion may be thicker than an apex of the nailing hem. The base of the nailing hem further comprises at least one spur extending transversely in a forward direction. The spur can also extend transversely in the lower direction.

Also disclosed in embodiments is an insulation panel comprising a foam insulating layer and an attachment member. The foam insulating layer comprises a front face, a rear face, a first end edge, and a second end edge that define a body of the foam insulating layer. The attachment member comprises a main portion, a nailing hem, a lower leg, a primary flange, and a secondary flange. The main portion has a forward edge and a rear edge. The nailing hem extends transversely from the rear edge of the main portion in an upper direction. The lower leg extends transversely from the main portion in a lower direction. The primary flange and the secondary flange each extend transversely from the lower leg, with the primary flange being located along the lower leg further from the main portion than the secondary flange. The secondary flange is longer than the primary flange.

The insulation panel may further comprise a veneer panel attached to the front face of the foam insulating layer. The first end edge of the foam insulating layer may include a tongue, with the second end edge of the foam insulating layer including a groove, and the tongue being shaped to fit within the groove. The foam insulating layer may further comprise a recess in the rear face that is shaped to accommodate the nailing hem. The second end edge of the foam insulating layer may include a groove that forms a front ridge and a rear ridge in the second end edge. The first end edge of the foam insulating layer may be planar from the front face to the rear face.

The front face of the foam insulating layer may be angled with respect to the rear face. Alternatively, a thickness of the second end edge of the foam insulating layer may be greater than a thickness of the first end edge of the foam insulating layer. Sometimes, a thickness of the foam insulating layer between the front face and the rear face is generally constant from the first end edge to the second end edge.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 13 is a side view of the insulation panel of FIG. 12 in an assembled form.

FIG. 14 is a side view showing two insulation panels of FIG. 13 stacked upon each other.

DETAILED DESCRIPTION

Figure 1:
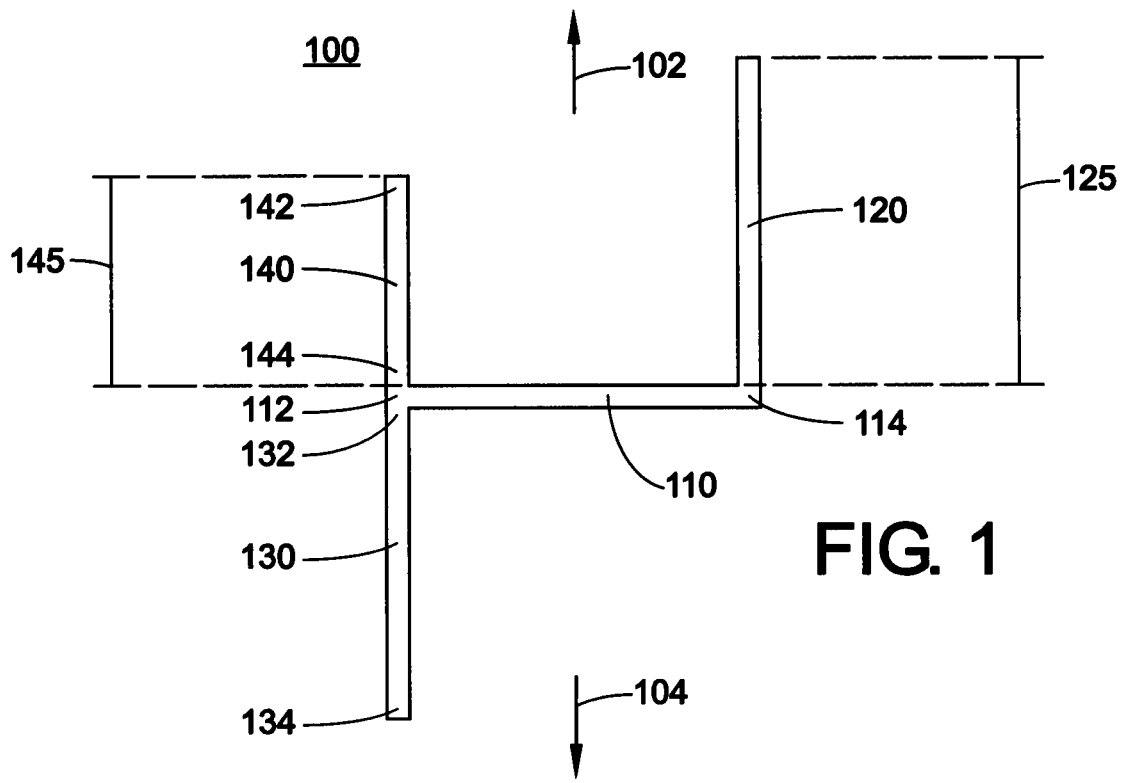
FIG. 1 is a side view of a first exemplary embodiment of an attachment member according to the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The term "between" is used in some places to describe a range of locations with respect to two endpoints. This term should be construed to also include the two endpoints. For example, a member that is described as being located "between a first end and a second end" should be construed to possibly be located at the first end and the second end as well.

The modifiers "substantially" and "generally" when used herein in connection with an angle permits no more than 2 degrees of variance in either direction.

The present disclosure relates to various embodiments of attachment members which can be used to attach insulation to the wall of a building. The attachment member can be part of an insulation panel (also referred to as a composite siding panel). The insulation panel includes the attachment member and a foam insulation layer in which the attachment member is embedded. The insulation panel can also include a veneer panel or siding panel which is attached to the front of the foam insulation layer.

Referring to the exemplary embodiment of FIG. 1, an attachment member 100 generally has three parts. A connection portion or main portion 110 of the attachment member has a forward edge 112 and a rear edge 114. A hem portion or nailing hem 120 extends transversely from the rear edge 114 of the main portion in an upper direction (indicated by arrow 102). The hem portion/nailing hem includes openings or receptacles (not visible) through which fasteners (e.g. nails, staples, etc.) are inserted. A male connecting member or lower leg 130 extends transversely from the main portion 110 in a lower direction (indicated by arrow 104). The upper direction 102 is opposite the lower direction 104. Described in another way, the connection portion 110 joins the male connecting member 130 and the hem portion 120 together. The male connecting member/lower leg 130 has an upper or first end 132, and a lower or second end 134. The first end 132 of the lower leg is connected to the connection portion/main portion 110.

In particular embodiments, the nailing hem 120 and the lower leg 130 extend substantially perpendicularly from the main portion 110. Put another way, the hem portion/nailing hem 120 and the male connecting member/lower leg 130 are substantially parallel to each other.

In the exemplary embodiment shown in FIG. 1, the lower leg 130 is connected to the main portion 110 along the forward edge 112. The attachment member also includes a forward wall 140, which has a first end 142 and a second end 144. The second end 144 of the forward wall connects to the main portion 110 along the forward edge 112. The first end 142 can also be referred to as the upper edge of the first wall. The forward wall 140 extends in the upper direction 102 from the main portion 110. As shown here, the lower leg 130, the forward wall 140, and the nailing hem 120 may be substantially parallel to each other. Put another way, the lower leg 130, the forward wall 140, and the nailing hem 120 extend substantially perpendicularly from the main portion 110. Also, the height 125 of the nailing hem is greater than the height 145 of the forward wall.

Figure 2:
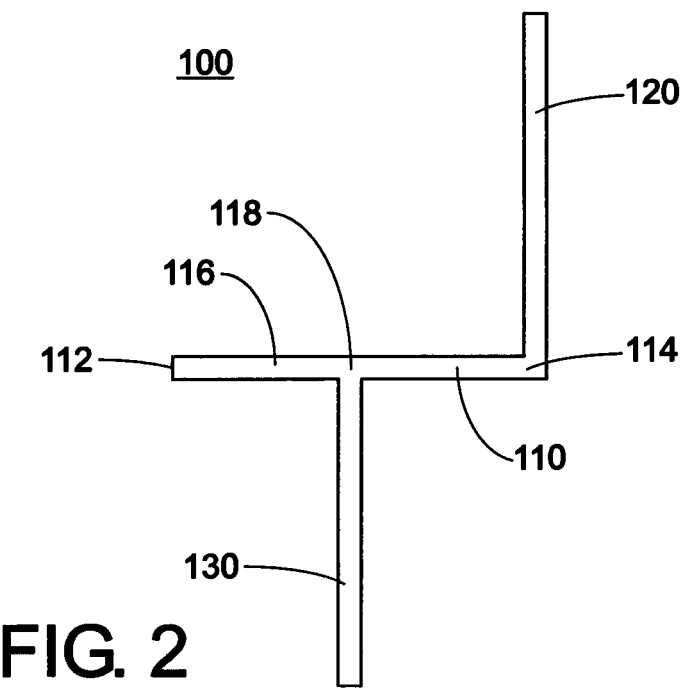
FIG. 2 is a side view of a second exemplary embodiment of an attachment member according to the present disclosure.

FIG. 2 is a second exemplary embodiment of an attachment member. Here, the lower leg 130 connects to the main portion 110 in a central location 116, rather than along the forward edge 112 as in FIG. 1. Put another way, the lower leg 130 connects to the main portion 110 at a point between the forward edge 112 and the rear edge 114. In specific embodiments, the lower leg connects 130 to the main portion 110 at the midpoint 118 of the main portion. No forward wall is present here.

Figure 3:
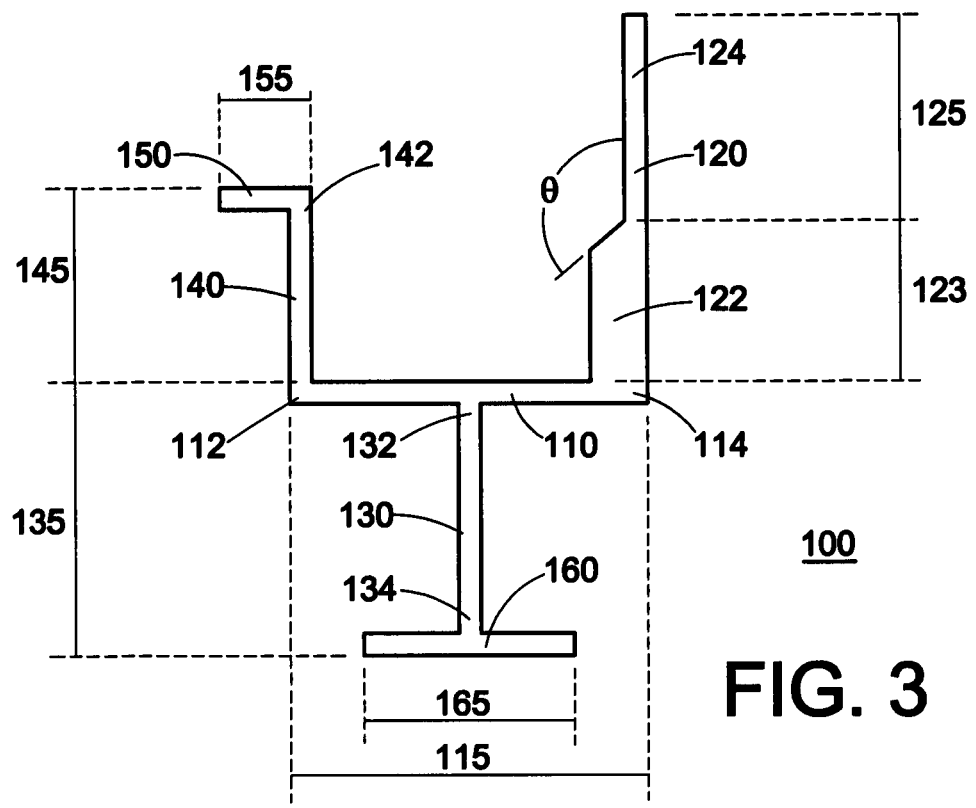
FIG. 3 is a side view of a third exemplary embodiment of an attachment member according to the present disclosure.

FIG. 3 is a third exemplary embodiment of an attachment member. Here, the nailing hem 120 has a base 122 that connects to the main portion 110, and an apex 124 at the opposite end. The base 122 is thicker than the apex 124. The top of the base has an angle θ which is shown here as being 135°, and may generally be from about 120° to about 160°. This embodiment includes a forward wall 140. An optional lip 150 may extend transversely from the first end or upper edge 142 of the forward wall. In addition, an anchor portion or flange 160 extends transversely from the male connecting member/lower leg 130. As shown here, the flange 160 extends from the second end 134 of the lower leg. Generally the flange 160 can extend away from the lower leg anywhere between the first end 132 and the second end 134 of the lower leg, though usually closer to the second end than the first end. In embodiments, the anchor portion/flange 160 is substantially parallel to the connection portion/main portion 110. Here, the flange 160 extends for an equal distance forward and backward of the lower leg 130. However, it is contemplated that the flange 160 may extend in only one direction from the lower leg 130, or that the flange can extend for different distances in the two directions from the lower leg.

Figure 4:
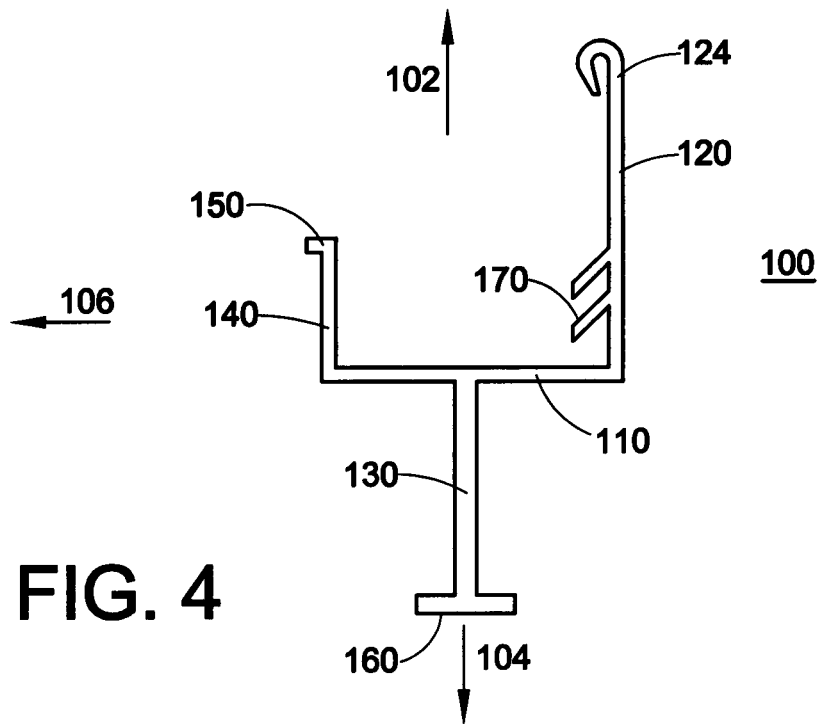
FIG. 4 is a side view of a fourth exemplary embodiment of an attachment member according to the present disclosure.

FIG. 4 is a fourth exemplary embodiment of an attachment member. Here, the attachment member 100 includes the forward wall 140, lip 150, and flange 160 previously discussed in the other exemplary embodiments. Two spurs 170 extend from the base of the nailing hem. The spurs extend transversely in the lower direction 104 and in the forward direction 106. It should be noted that the apex 124 of the nailing hem here is rounded off in comparison to the embodiments of FIGS. 1-3.

Referring back to FIG. 3, the main portion 110 of the attachment member may have a thickness 115 of from about 1.0 inches to about 2.0 inches. The nailing hem 120 of the attachment member may have a total height 125 of from about 1.0 inches to about 4.5 inches. The base 122 of the nailing hem may have a height 123 of from about 0.5 inches to about 2.0 inches. Generally, the bottom half of the nailing hem should be considered the base. The remainder of the nailing hem may be considered the apex 124. The forward wall 140 of the attachment member may have a height 145 of from about 0.25 inches to about 3 inches, including from about 0.25 inches to about 1 inch. Again, it should be mentioned that when a forward wall is present, the height 145 of the forward wall is less than the height 125 of the nailing hem. The lip 150 of the attachment member may have a width 155 of from about 0.01 inches to about 0.1 inches. The lower leg 130 of the attachment member may have a height 135 of from about 0.5 inches to about 2.0 inches. The flange 160 of the attachment member may have a width 165 of from about 0.25 inches to about 1.5 inches. It should be noted that the flange 160 is shorter than the main portion 110 of the attachment member, i.e. width 165 is less than thickness 115.

Figure 5:
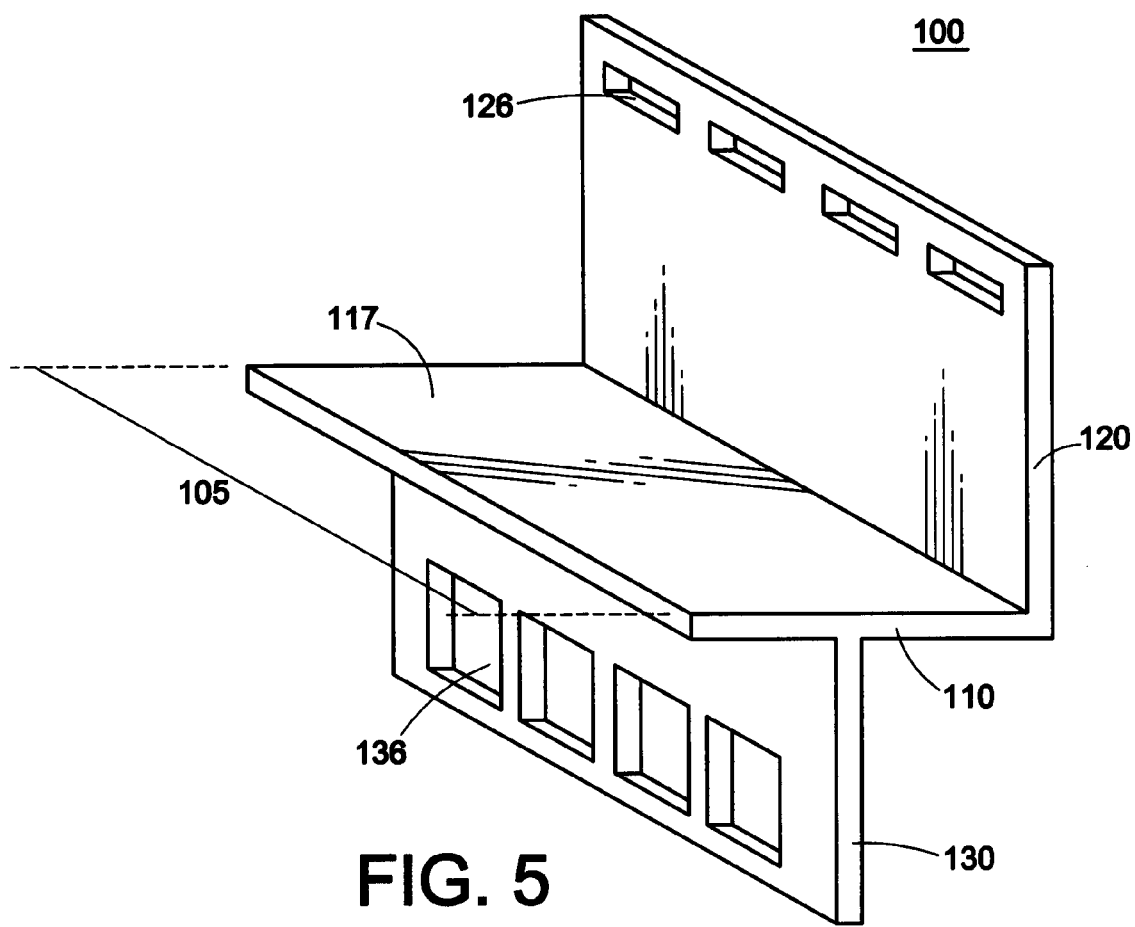
FIG. 5 is a perspective view of the attachment member of FIG. 2.

FIG. 5 is a perspective view of the attachment member of FIG. 2, and illustrates additional aspects of the attachment member which apply to all embodiments described herein. Here, the openings/receptacles 126 in the nailing hem 120 are visible. In addition, one or more apertures 136 may be present in the lower leg 130 of the attachment member as well. As explained further herein, the lower leg can be embedded in a foam insulating layer during formation of the foam layer, and these apertures can further anchor the attachment member into the foam layer when foam passes through the apertures and solidifies. Such apertures in the lower leg are not necessary, and may be absent. The upper surface 117 of the main portion is flat. The attachment member may have any desired length 105, although it is contemplated that the length will be from about 3 feet to about 6 feet, including about 4 feet.

The attachment members of the present disclosure are useful in forming insulation panels or composite siding panels. The attachment members can be inserted into a foam insulating layer, or can be embedded into the foam insulating layer during the manufacture of the foam insulating layer. It is contemplated that this combination of attachment member and foam insulating layer can be sold as an intermediate product to a producer. A veneer panel or siding panel can also be attached to the insulation panel/composite siding panel.

Figure 6:
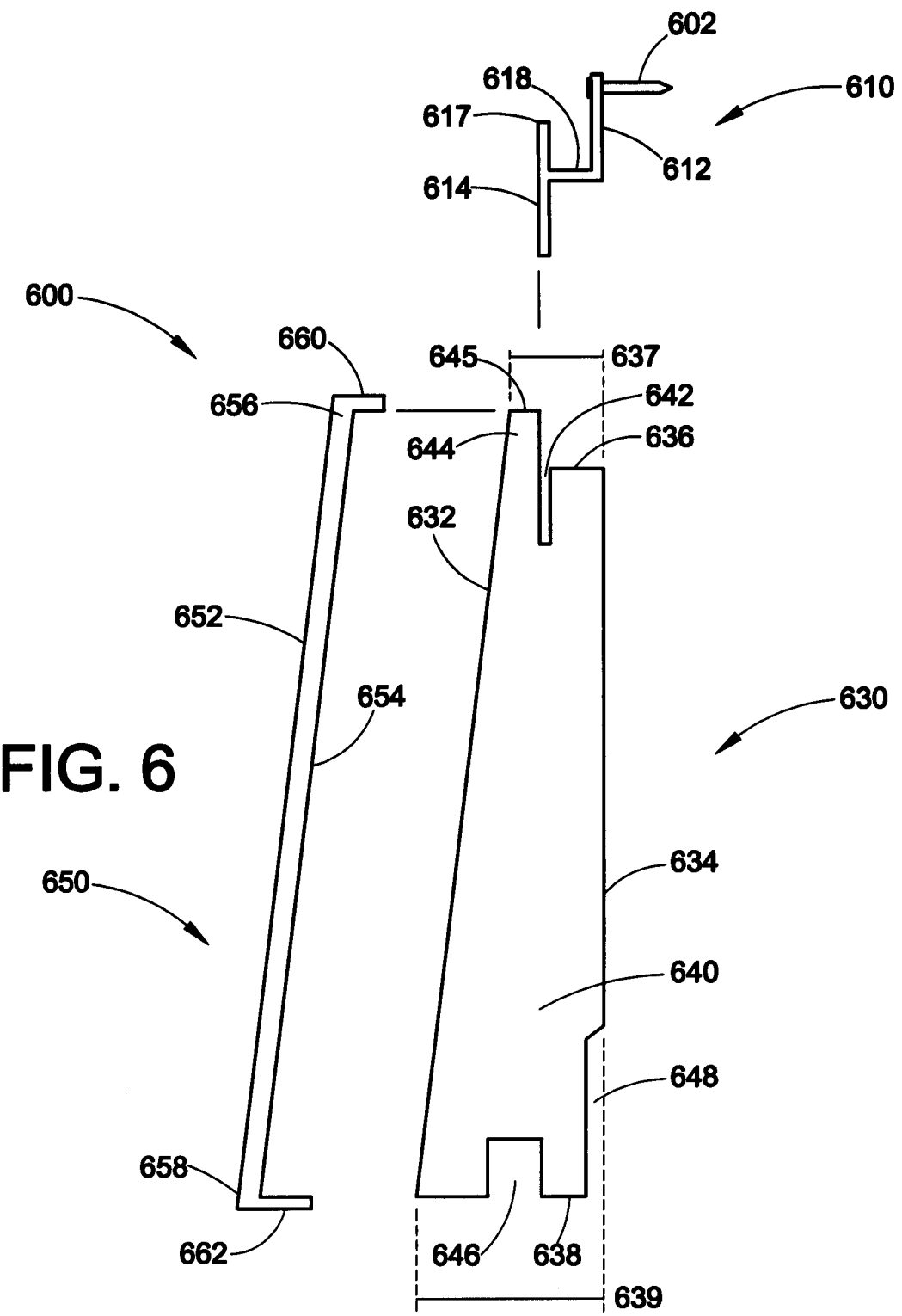
FIG. 6 is an exploded view of a first exemplary embodiment of an insulation panel according to the present disclosure.
Figure 7:
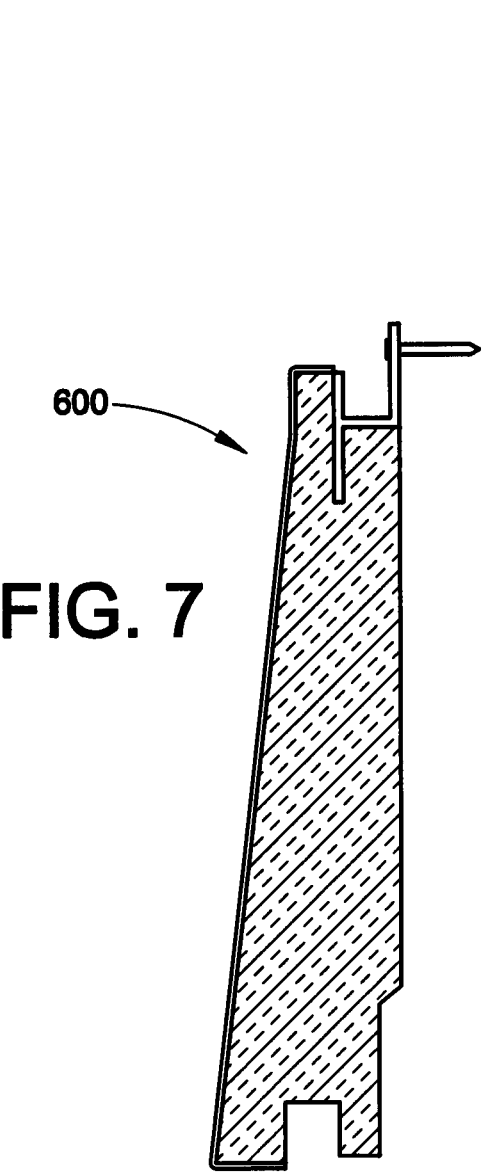
FIG. 7 is a side view of the insulation panel of FIG. 6 in an assembled form.
Figure 8:
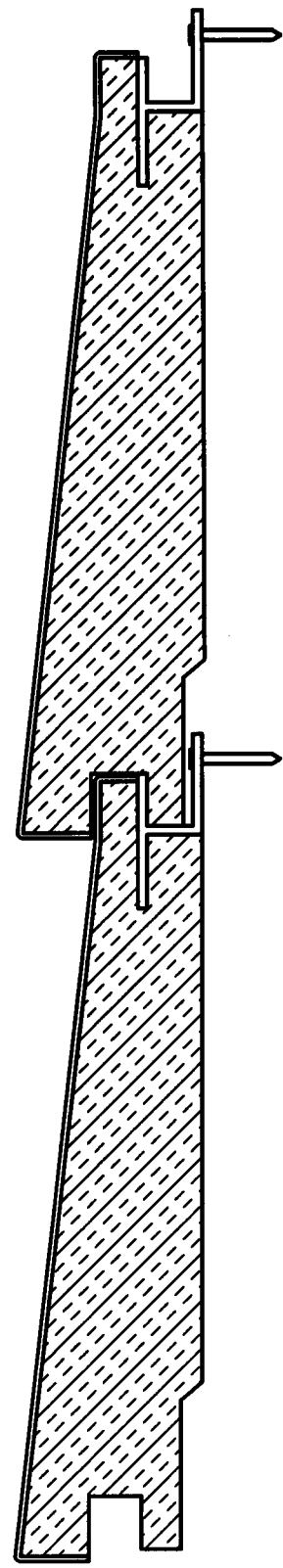
FIG. 8 is a side view showing two insulation panels of FIG. 6 stacked upon each other.

FIG. 6 is an exploded view of a first exemplary embodiment of an insulation panel or composite siding panel. FIG. 7 shows the insulation panel in an assembled form. FIG. 8 shows two insulation panels stacked upon each other to illustrate how their various parts interact.

The insulation panel 600 includes an attachment member 610, a foam insulating layer 630, and a veneer panel 650. The attachment member 610 shown here is the same as that of FIG. 1. A fastening means, illustrated here as a nail 602, extends through the nailing hem 612 to attach the insulation panel to, for example, an exterior wall of a building.

The foam insulating layer 630 includes a front face 632 which is spaced apart from a rear face 634. A first end edge 636 and a second end edge 638 join the front face 632 and the rear face 634 at opposite ends of the foam insulating layer. (It should be noted that the first end edge and the second end edges are also surfaces, but are referred to as edges from this side view.) The front face 632, rear face 634, first end edge 636, and second end edge 638 define a body 640 of the foam insulating layer. The front face 632 is angled with respect to the rear face 634. Put another way, the thickness 637 at the first end edge 636 is less than the thickness 639 at the second end edge 638.

When the attachment member 610 is inserted into the foam insulating layer, the foam insulating layer 630 may be considered to have a female connecting member 642 extending into the body 640 along the first end edge 636, into which the male connecting member/lower leg 614 extends. Alternatively, the male connecting member/lower leg 614 may simply be described as extending into the body 640 along the first end edge 636. The nailing hem 612 of the attachment member is substantially aligned with the rear face 634 of the foam insulating layer. Described another way, in this embodiment, the main portion 618 of the attachment member does not extend to the front face 632 of the foam insulating layer.

The veneer panel 650 has a front face 652, a rear face 654, a first end edge 656, and a second end edge 658. The veneer panel 650 is attached to the front face 632 of the foam insulating layer by its rear face 654. The veneer panel shown in FIG. 6 also has a first wall 660 that extends transversely rearward from the first end edge 656. This first wall 660 is located at the height of the upper edge 617 of the forward wall 616 of the attachment member, or is placed to cover the upper surface 645 of the tongue 644 of the foam insulating layer 630. The veneer panel 650 also has a second wall 662 that extends transversely rearward from the second end edge 658. In this embodiment, the first wall 660 and second wall 662 of the veneer panel are substantially parallel to each other.

Generally speaking, the attachment member 610 and the first end edge 636 cooperate to be complementary in shape with the second end edge 638 of the foam insulating layer. This allows adjacent panels to engage each other. In this exemplary embodiment, a tongue, protrusion, or first joining element 644 extends from the first end edge 636 of the foam insulating layer along the front face 632. Similarly, a groove, rabbet, or second joining element 646 extends into the second end edge 638. The tongue 644 is shaped to fit within the groove 646. The groove 646 is sized to receive the tongue 644 of the foam insulating layer, the forward wall 616 of the attachment member, and the first wall 660 of the veneer panel. A recess 648 is present in the rear face 634 of the foam insulating layer along the second end edge 638 and is shaped to accommodate the nailing hem 612 of the attachment member. As a result, as seen in FIG. 8, adjacent panels can engage each other.

Figure 9:
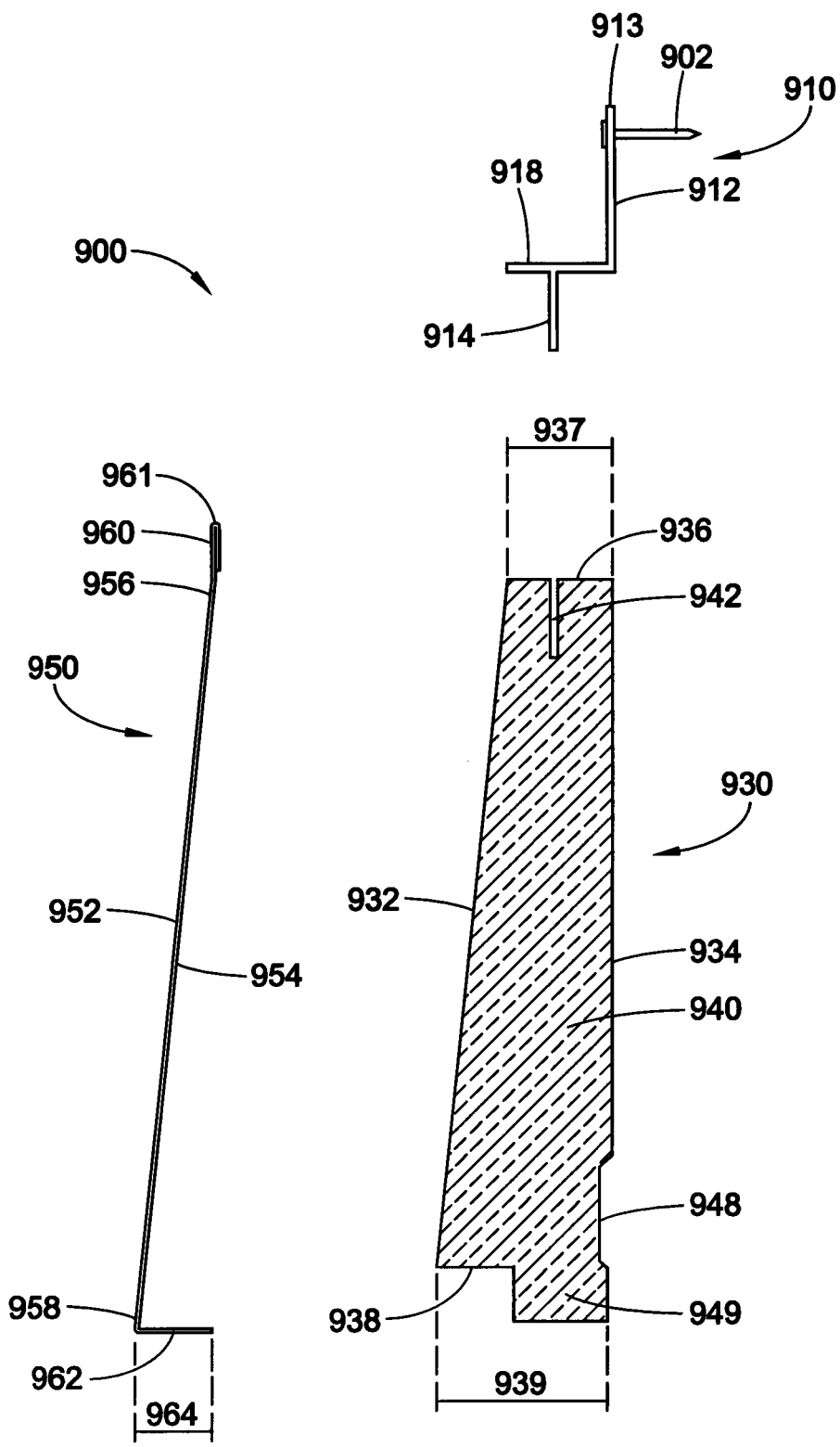
FIG. 9 is an exploded view of a second exemplary embodiment of an insulation panel according to the present disclosure.
Figures 10, 11:
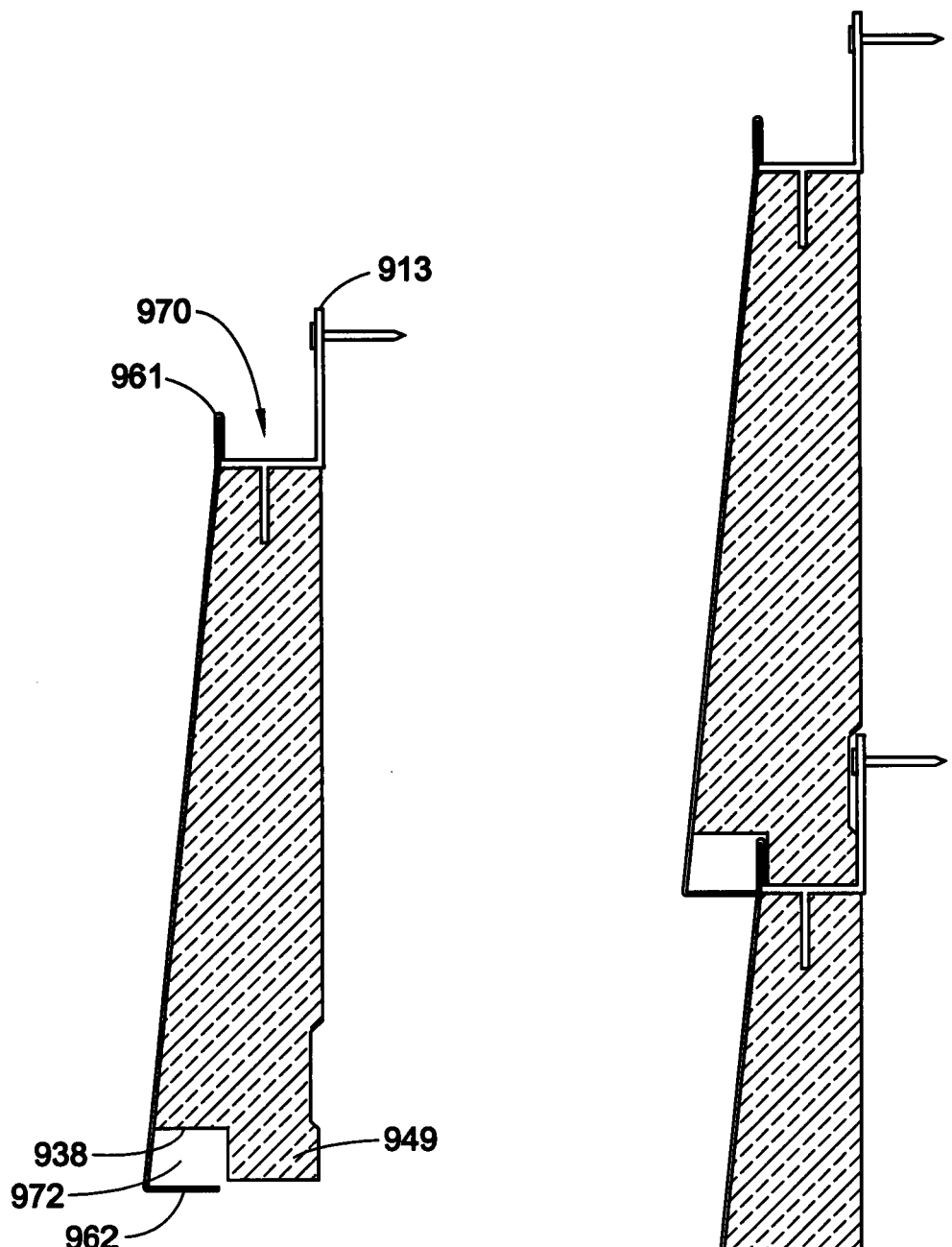
FIG. 10 is a side view of the insulation panel of FIG. 9 in an assembled form.
FIG. 11 is a side view showing two insulation panels of FIG. 10 stacked upon each other.

FIG. 9 is an exploded view of a second exemplary embodiment of an insulation panel or composite siding panel. FIG. 10 shows the insulation panel in an assembled form. FIG. 11 shows two insulation panels stacked upon each other to illustrate how their various parts interact.

The insulation panel 900 includes an attachment member 910, a foam insulating layer 930, and a veneer panel 950. The attachment member 910 shown here is the same as that of FIG. 2. A fastening means, illustrated here as a nail 902, extends through the nailing hem 912 to attach the insulation panel to, for example, an exterior wall of a building.

Again, the foam insulating layer 930 includes a front face 932 which is spaced apart from a rear face 934. A first end edge 936 and a second end edge 938 join the front face 932 and the rear face 934 at opposite ends of the foam insulating layer. The front face 932, rear face 934, first end edge 936, and second end edge 938 define a body 940 of the foam insulating layer. The front face 932 is angled with respect to the rear face 934. Put another way, the thickness 937 at the first end edge 936 is less than the thickness 939 at the second end edge 938.

Also, compared to the embodiment of FIG. 6, the first end edge 936 is flat (i.e. planar) from the front face 932 to the rear face 934. No joining element extends from the first end edge. The attachment member 910 entirely covers the first end edge 936 of the foam insulating layer.

The foam insulating layer 930 may be considered to have a channel or female connecting member 942 extending into the body 940 along the first end edge 936, into which the male connecting member/lower leg 914 extends. Alternatively, the male connecting member/lower leg 914 may simply be described as extending into the body 940 along the first end edge 936. The nailing hem 912 of the attachment member is substantially aligned with the rear face 934 of the foam insulating layer.

The veneer panel 950 has a front face 952, a rear face 954, a first end edge 956, and a second end edge 958. The veneer panel 950 is attached to the front face 932 of the foam insulating layer by its rear face 954. Here, the first end edge 956 of the veneer panel is adjacent the first end edge 936 of the foam insulating layer. A first wall 960 of the veneer panel extends transversely upward from the first end edge 956 of the veneer panel beyond the first end edge 936 of the foam insulating layer. However, the upper edge 961 of the first wall 960 of the veneer panel is below the apex 913 of the nailing hem 912. Compared to the embodiment of FIGS. 6-8, the first wall 960 could be considered a rough equivalent of the forward wall 516 of the attachment member. In specific embodiments, the first wall 960 of the veneer panel is substantially parallel to the nailing hem 912 of the attachment member, or in other words is substantially perpendicular to the main portion 918 of the attachment member.

The second end edge 958 of the veneer panel extends beyond the second end edge 938 of the foam insulating layer. The veneer panel 950 also has a second wall 962 that extends transversely rearward from the second end edge 958. A rear segment 949 extends from the second end edge 938 of the foam insulating layer along the rear face 934.

Again, the attachment member 910 and the first end edge 936 cooperate to be complementary in shape with the second end edge 938 of the foam insulating layer, so that adjacent panels can engage each other. As seen in FIG. 10, the rear segment 949 is complementary to a channel 970 formed by the first wall 960 of the veneer panel and the attachment member 910. The second wall 962 has a width 964 such that a pocket 972 is formed between the rear segment 949 of the foam insulating layer, the second end edge 938 of the foam insulating layer, and the second wall 962 of the veneer panel. The first wall 960 of the veneer panel fits between the second wall 962 and the rear segment 949. A recess 948 is present in the rear face 934 of the foam insulating layer along the second end edge 938 and is sized to accommodate the nailing hem 912 of the attachment member. As a result, as seen in FIG. 11, adjacent panels can engage each other.

Figure 12:
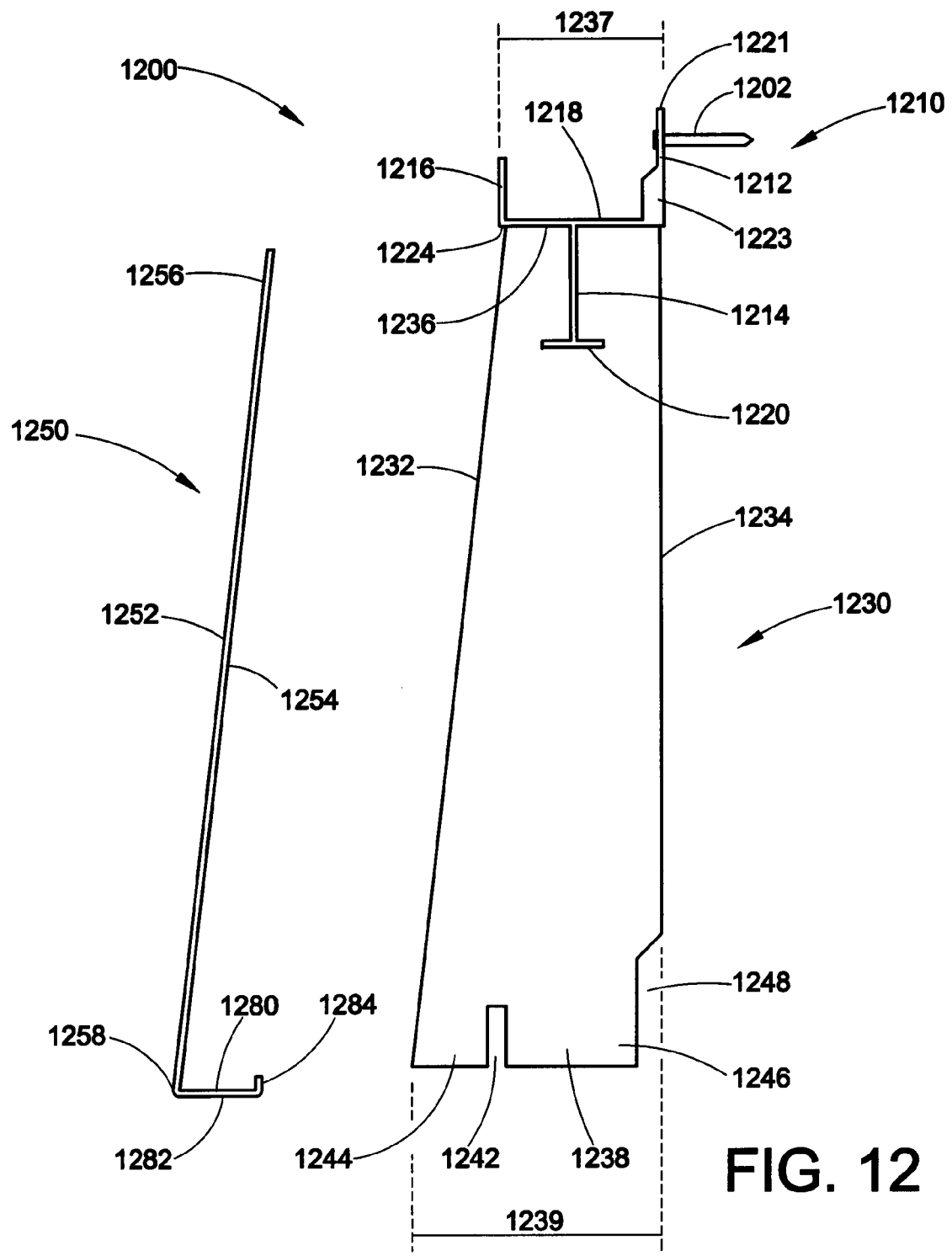
FIG. 12 is an exploded view of a third exemplary embodiment of an insulation panel according to the present disclosure.

FIG. 12 is an exploded view of a third exemplary embodiment of an insulation panel or composite siding panel. FIG. 13 shows the insulation panel in an assembled form. FIG. 14 shows two insulation panels stacked upon each other to illustrate how their various parts interact.

The insulation panel 1200 includes an attachment member 1210, a foam insulating layer 1230, and a veneer panel 1250. The attachment member 1210 shown here is similar to the one depicted in FIG. 3, and does not have the lip. Rather, the attachment member is made up of the main portion 1218, nailing hem 1212, lower leg 1214, forward wall 1216, and the flange 1220 extending transversely from the lower end of lower leg 1214. The base 1223 of the nailing hem 1212 is thicker than the apex 1221 of the nailing hem. A fastening means is illustrated here as a nail 1202 extending through the nailing hem 1212. The flange is useful in improving wind load performance of the overall panel, as well as increasing pull-out resistance (i.e. separation of the attachment member from the foam insulating layer).

Again, the foam insulating layer 1230 includes a front face 1232 which is spaced apart from a rear face 1234. A first end edge 1236 and a second end edge 1238 join the front face 1232 and the rear face 1234 at opposite ends of the foam insulating layer. The front face 1232, rear face 1234, first end edge 1236, and second end edge 1238 define a body 1240 of the foam insulating layer. The front face 1232 is angled with respect to the rear face 1234. Put another way, the thickness 1237 at the first end edge 1236 is less than the thickness 1239 at the second end edge 1238. Here, like the embodiment of FIG. 9, the first end edge 1236 is planar (i.e. flat) from the front face 1232 to the rear face 1234. No joining element extends from the first end edge. The attachment member 1210 entirely covers the first end edge 1236 of the foam insulating layer. A groove 1242 is located in the second end edge 1238 of the foam insulating layer. The groove divides the body along the second end edge 1238 into a front ridge 1244 and a rear ridge 1246.

In this embodiment, the male connecting member/lower leg 1214 and the flange 1220 are embedded in the body 1240 along the first end edge 1236. The nailing hem 1212 of the attachment member is substantially aligned with the rear face 1234 of the foam insulating layer.

The veneer panel 1250 has a front face 1252, a rear face 1254, a first end edge 1256, and a second end edge 1258. The veneer panel 1250 is attached to the front face 1232 of the foam insulating layer by its rear face 1254. The first end edge 1256 of the veneer panel is adjacent the first end edge 1236 of the foam insulating layer. As depicted here, the main portion 1218 of the attachment member extends beyond the front face 1232 of the foam insulating layer, such that the first end edge 1256 of the veneer panel also abuts the lower surface 1224 of the main portion 1218.

However, it is also possible that a first wall of the veneer panel could extend transversely upward from the first end edge 1256 of the veneer panel beyond the first end edge 1236 of the foam insulating layer, similar to the veneer panel depicted in FIG. 9. That first wall would be adjacent to the forward wall 1216 of the attachment member and the upper edge of that first wall would end below the apex 1221 of the nailing hem 1212. It is also possible that the attachment member would include a lip, with the lip capping the first wall extending from the veneer panel.

Returning to FIG. 12, the veneer panel includes a channel 1280 that extends transversely rearward from the second end edge 1258 of the veneer panel. The channel 1280 is made from a lower wall 1282 and a rear wall 1284 that extends upwards from the end of the lower wall. The front ridge 1244 on the second end edge of the foam insulating panel enters the channel 1280. The rear wall 1284 enters the groove 1242.

Again, the attachment member 1210 and the first end edge 1236 cooperate to be complementary in shape with the second end edge 1238 of the foam insulating layer, so that adjacent panels can engage each other. As seen in FIG. 14, the rear ridge 1246 fits into the attachment member 1210. The groove 1242 on the second end edge of the foam insulating layer is complementary to the forward wall 1216 of the attachment member, so that the forward wall 1216 enters the groove 1242. A recess 1248 is present in the rear face 1234 of the foam insulating layer along the second end edge 1238 and is sized to accommodate the nailing hem 1212 of the attachment member. As a result, adjacent panels can engage each other.

Figure 15:
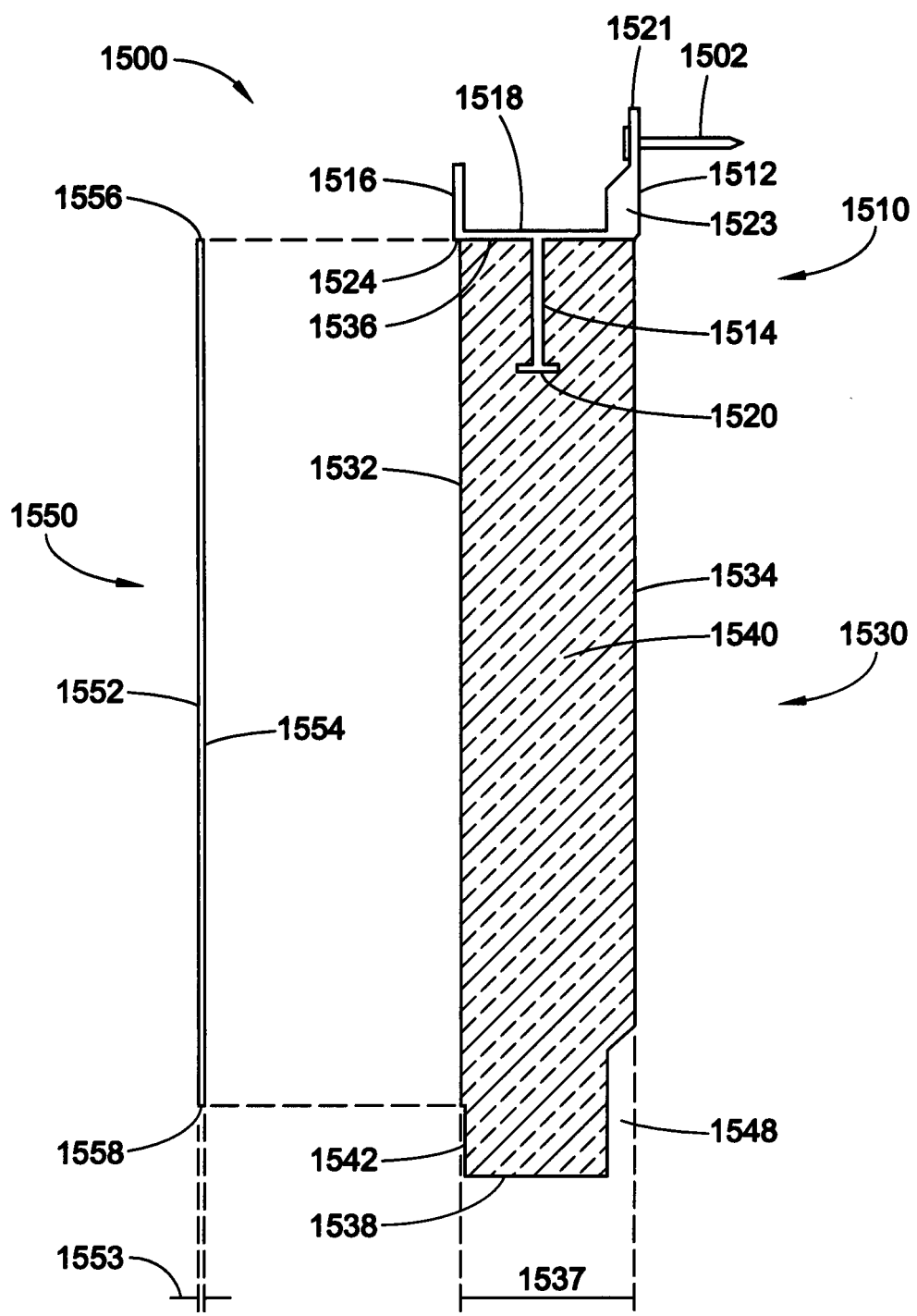
FIG. 15 is an exploded view of a fourth exemplary embodiment of an insulation panel according to the present disclosure.
Figures 16, 17:
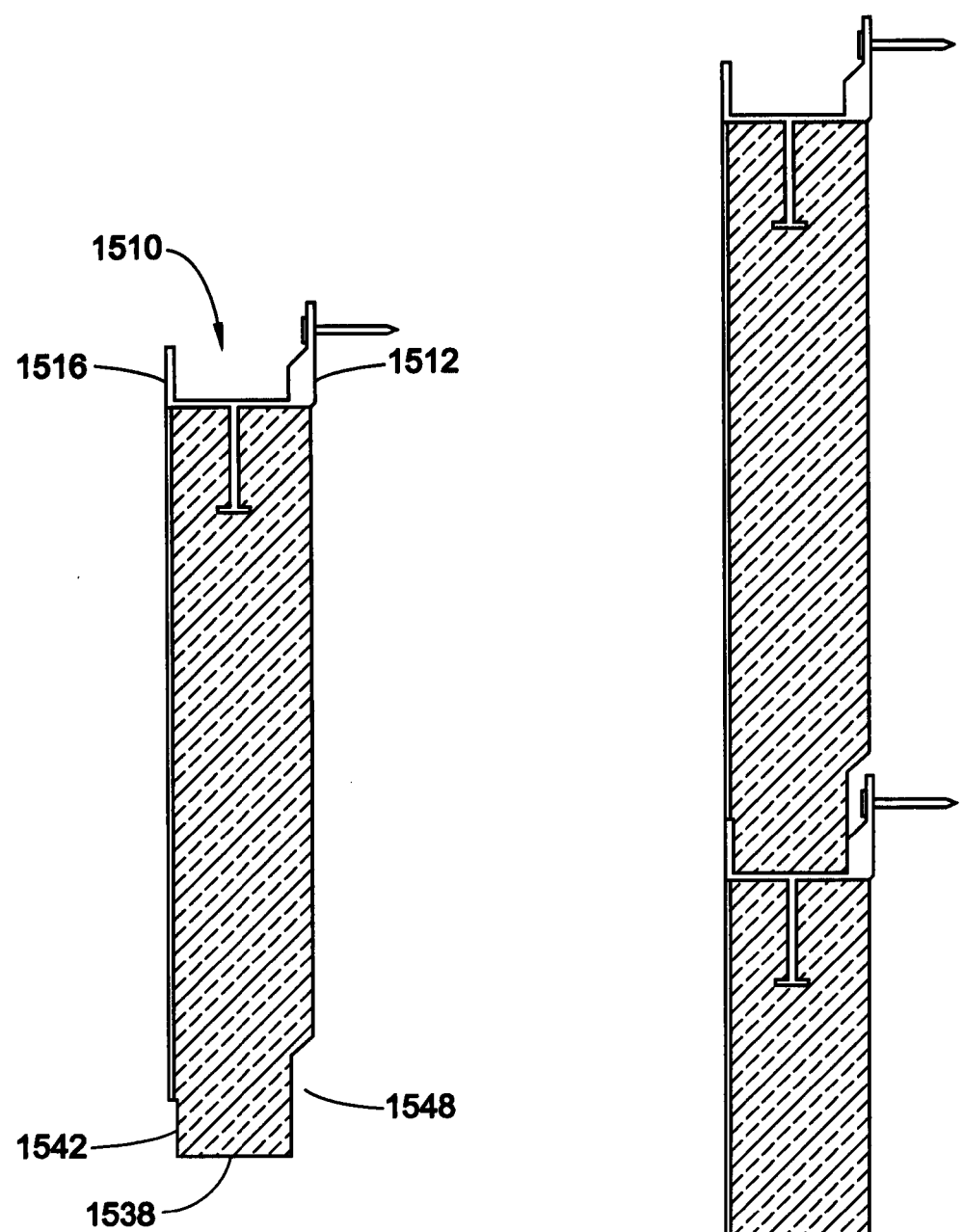
FIG. 16 is a side view of the insulation panel of FIG. 15 in an assembled form.
FIG. 17 is a side view showing two insulation panels of FIG. 16 stacked upon each other.

FIG. 15 is an exploded view of a fourth exemplary embodiment of an insulation panel or composite siding panel. FIG. 16 shows the insulation panel in an assembled form. FIG. 17 shows two insulation panels stacked upon each other to illustrate how their various parts interact.

The insulation panel 1500 includes an attachment member 1510, a foam insulating layer 1530, and a veneer panel 1550. The attachment member 1510 shown here is similar to the one depicted in FIG. 3, again without the lip. The attachment member is made up of the main portion 1518, nailing hem 1512, lower leg 1514, forward wall 1516, and the flange 1520 extending transversely from the lower end of lower leg 1514. The base 1523 of the nailing hem 1512 is thicker than the apex 1521 of the nailing hem. A fastening means is illustrated here as a nail 1502 extending through the nailing hem 1512.

Again, the foam insulating layer 1530 includes a front face 1532 which is spaced apart from a rear face 1534. A first end edge 1536 and a second end edge 1538 join the front face 1532 and the rear face 1534 at opposite ends of the foam insulating layer. The front face 1532, rear face 1534, first end edge 1536, and second end edge 1538 define a body 1540 of the foam insulating layer.

Here, like the embodiments of FIG. 9 and FIG. 12, the first end edge 1536 is planar (i.e. flat) from the front face 1532 to the rear face 1534. No joining element extends from the first end edge. The attachment member 1510 entirely covers the first end edge 1536 of the foam insulating layer. However, unlike those two embodiments, here, the front face 1532 is substantially parallel to the rear face 1534. Put another way, the thickness 1537 of the foam insulating layer between the front face 1532 and the rear face 1534 is generally constant from the first end edge 1536 to the second end edge 1538. The exceptions to this statement relate to the presence of a groove 1542 in the front face 1532 of the foam insulating layer along the second end edge, and the presence of a recess 1548 in the rear face of the foam insulating layer along the second end edge. The groove 1542 could also be considered a front recess, in comparison to the recess 1548 in the rear face. The first end edge 1536 is substantially perpendicular to the front face 1532 and the rear face 1534.

Again, the male connecting member/lower leg 1514 and the flange 1520 are embedded in the body 1540 along the first end edge 1536. The nailing hem 1512 of the attachment member is substantially aligned with the rear face 1534 of the foam insulating layer. The forward wall 1516 of the attachment member is substantially parallel to the front face 1532 of the foam insulating layer.

The veneer panel 1550 has a front face 1552, a rear face 1554, a first end edge 1556, and a second end edge 1558. The veneer panel 1550 is attached to the front face 1532 of the foam insulating layer by its rear face 1554. The first end edge 1556 of the veneer panel is adjacent the first end edge 1536 of the foam insulating layer. As depicted here, the main portion 1518 of the attachment member extends beyond the front face 1532 of the foam insulating layer, such that the first end edge 1556 of the veneer panel also abuts the lower surface 1524 of the main portion 1518. The second end edge 1558 of the veneer panel abuts the top of the groove 1542 in the front face.

Generally speaking, the veneer panel 1550 here is flat. Described another way, the front face 1552 is substantially parallel to the rear face 1554. Put in other words, the thickness 1553 of the foam insulating layer between the front face 1552 and the rear face 1554 is generally constant from the first end edge 1556 to the second end edge 1558.

Again, it is also possible that a first wall of the veneer panel could extend transversely upward from the first end edge 1556 of the veneer panel beyond the first end edge 1536 of the foam insulating layer, similar to the veneer panel depicted in FIG. 9. That first wall would be adjacent to the forward wall 1516 of the attachment member and the upper edge of that first wall would end below the apex 1521 of the nailing hem 1512. It is also possible that the attachment member would include a lip, with the lip capping the first wall extending from the veneer panel.

Again, the attachment member 1510 and the first end edge 1536 cooperate to be complementary in shape with the second end edge 1538 of the foam insulating layer, so that adjacent panels can engage each other. As seen in FIG. 17, the second end edge 1538 of the foam insulating layer fits into the attachment member 1510. The forward wall 1516 of the attachment member enters the groove 1542 in the front face of the foam insulating layer. The recess 1548 in the rear face 1534 of the foam insulating layer is sized to accommodate the nailing hem 1512 of the attachment member. As a result, adjacent panels can engage each other.

Figure 18:
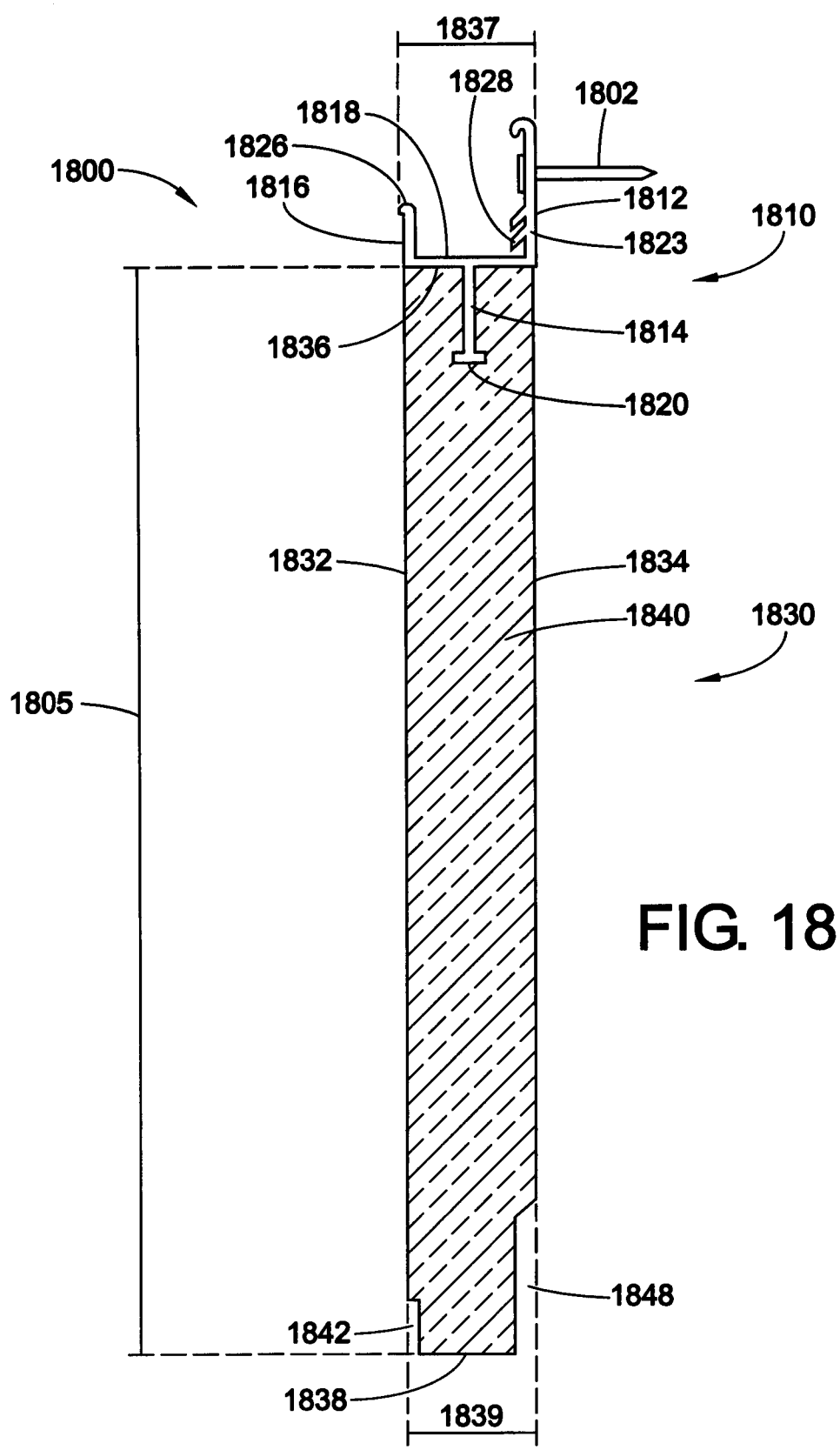
FIG. 18 is an exploded view of a fifth exemplary embodiment of an insulation panel according to the present disclosure.
Figure 19:
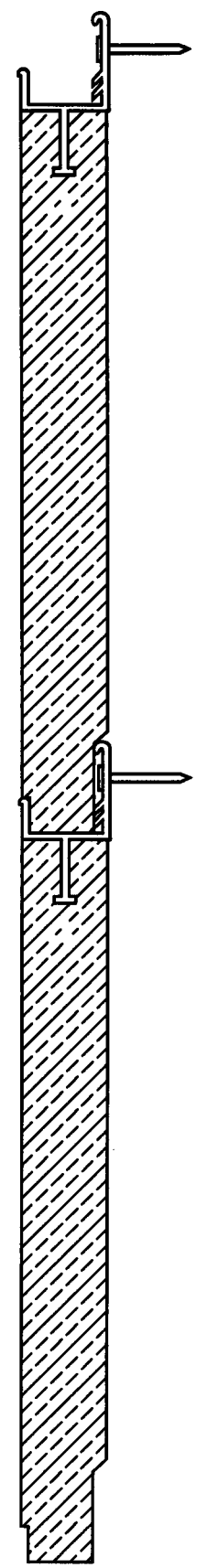
FIG. 19 is a side view showing two insulation panels of FIG. 18 stacked upon each other.

FIG. 18 is view of an assembled fifth exemplary embodiment of an insulation panel or composite siding panel. FIG. 19 shows two insulation panels stacked upon each other to illustrate how their various parts interact.

This fourth embodiment of an insulation panel 1800 is very similar to the embodiment shown in FIG. 15. One large difference is that this insulation panel is formed only from an attachment member 1810 and a foam insulating layer 1830. No veneer panel is present. The attachment member 1810 shown here is the one depicted in FIG. 4. The attachment member is made up of the main portion 1818, nailing hem 1812, lower leg 1814, forward wall 1816, the flange 1820 extending transversely from the lower end of lower leg 1814, and the lip 1826 extending transversely from the upper end of the forward wall 1816. The base 1823 of the nailing hem 1812 includes spurs 1828. A fastening means is illustrated here as a nail 1802 extending through the nailing hem 1812.

Again, the foam insulating layer 1830 includes a front face 1832 which is spaced apart from a rear face 1834. A first end edge 1836 and a second end edge 1838 join the front face 1832 and the rear face 1834 at opposite ends of the foam insulating layer. The front face 1832, rear face 1834, first end edge 1836, and second end edge 1838 define a body 1840 of the foam insulating layer.

The first end edge 1836 is planar (i.e. flat) from the front face 1832 to the rear face 1834. No joining element extends from the first end edge. The attachment member 1810 entirely covers the first end edge 1836 of the foam insulating layer. The front face 1832 is substantially parallel to the rear face 1834. Put another way, the thickness of the foam insulating layer between the front face 1832 and the rear face 1834 is generally constant from the first end edge 1836 to the second end edge 1838. The exceptions to this statement relate to the presence of a groove 1842 in the front face 1832 of the foam insulating layer along the second end edge, and the presence of a recess 1848 in the rear face of the foam insulating layer along the second end edge. The groove 1842 could also be considered a front recess, in comparison to the recess 1848 in the rear face. The first end edge 1836 is substantially perpendicular to the front face 1832 and the rear face 1834.

Again, the male connecting member/lower leg 1814 and the flange 1820 are embedded in the body 1840 along the first end edge 1836. The nailing hem 1812 of the attachment member is substantially aligned with the rear face 1834 of the foam insulating layer. The forward wall 1816 of the attachment member is substantially parallel to the front face 1832 of the foam insulating layer.

The attachment member 1810 and the first end edge 1836 cooperate to be complementary in shape with the second end edge 1838 of the foam insulating layer, so that adjacent panels can engage each other. As seen in FIG. 19, the second end edge 1838 of the foam insulating layer fits into the attachment member 1810. The forward wall 1816 of the attachment member enters the groove 1842 in the front face of the foam insulating layer. The recess 1848 in the rear face 1834 of the foam insulating layer is sized to accommodate the nailing hem 1812 of the attachment member. As a result, adjacent panels can engage each other. The spurs 1828 help to prevent separation between the adjacent panels.

Figure 20:
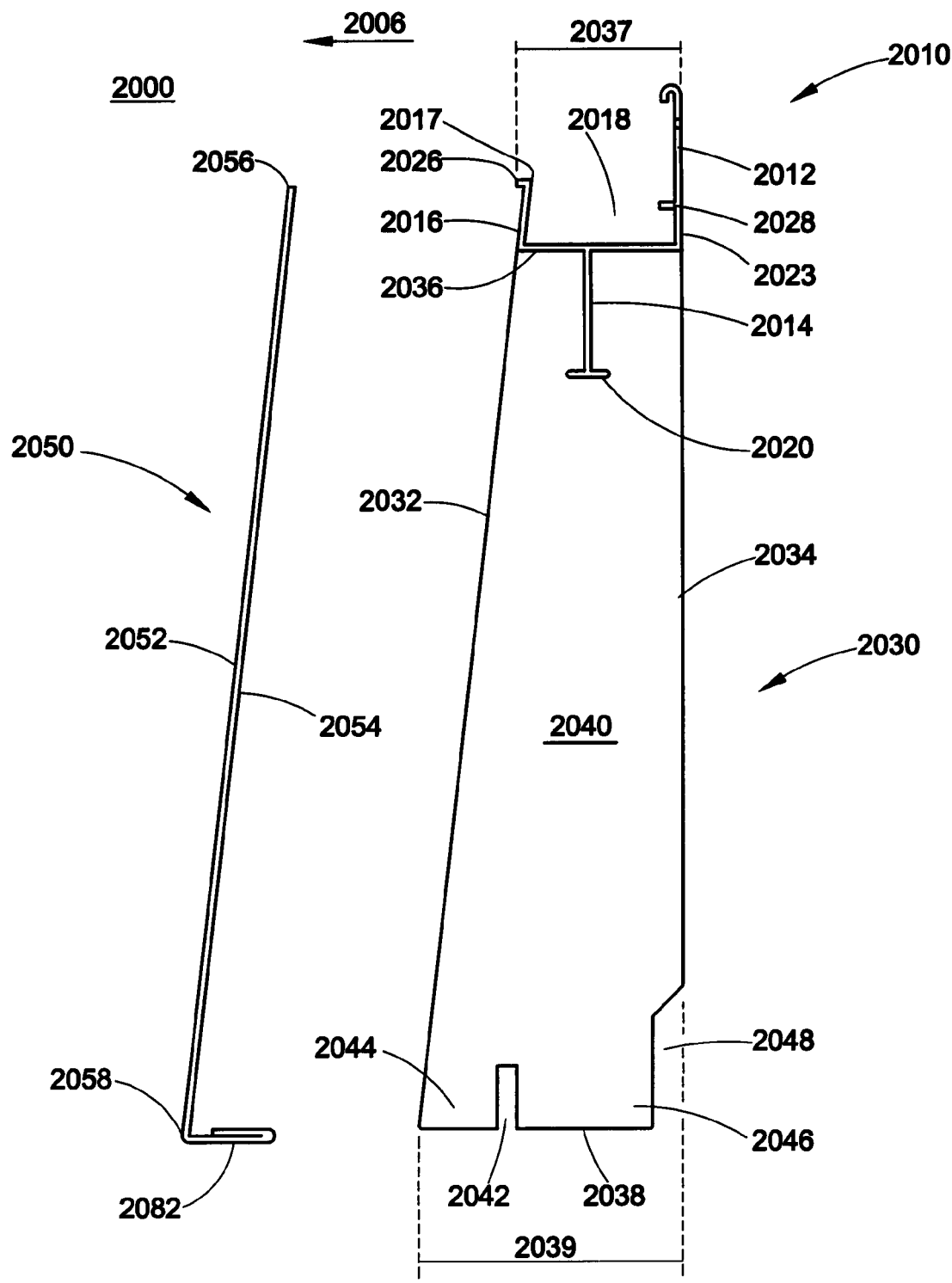
FIG. 20 is an exploded view of a sixth exemplary embodiment of an insulation panel according to the present disclosure.
Figure 21:
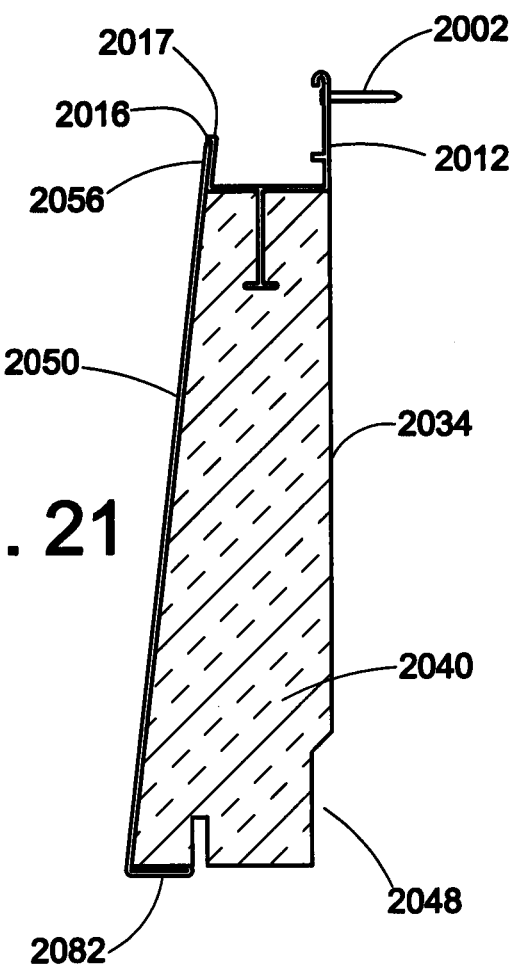
FIG. 21 is a side view of the insulation panel of FIG. 20.
Figure 22:
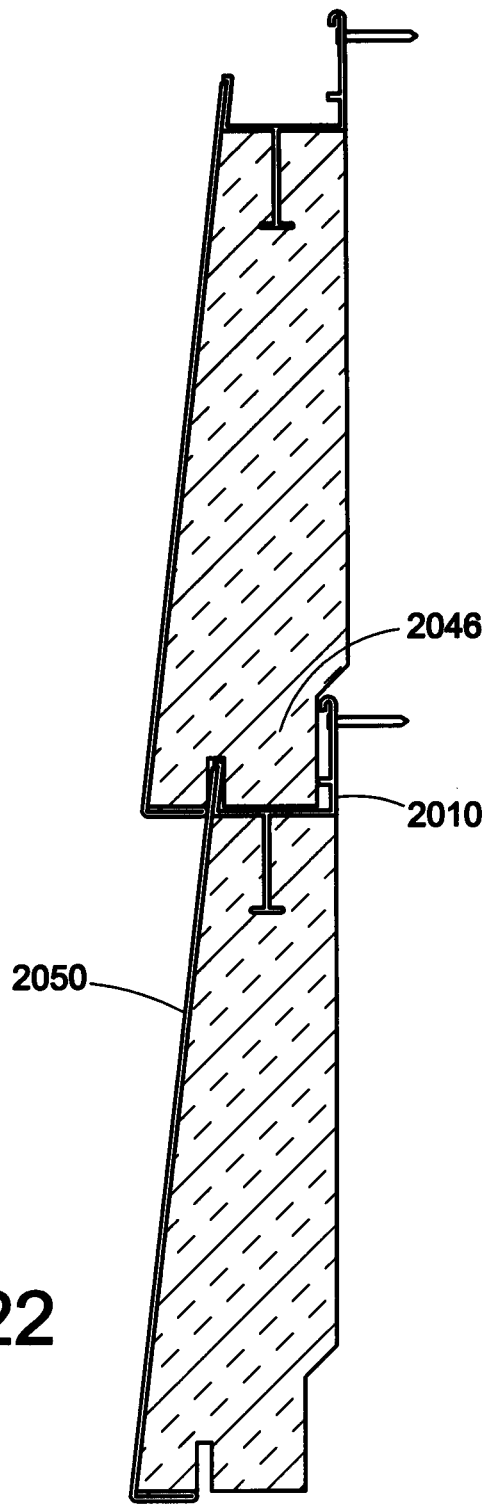
FIG. 22 is a side view showing two insulation panels of FIG. 20 stacked upon each other.

FIG. 20 is an exploded side view of a sixth exemplary embodiment of an insulation panel or composite siding panel. FIG. 21 is a side view of the insulation panel. FIG. 22 shows two insulation panels stacked upon each other to illustrate how their various parts interact.

The insulation panel 2000 includes an attachment member 2010, a foam insulating layer 2030, and a veneer panel 2050. The attachment member 2010 shown here is similar to the one depicted in FIG. 4. The attachment member is made up of the main portion 2018, nailing hem 2012, lower leg 2014, forward wall 2016, the lip 2026 extending from an upper edge of the forward wall 2016, and the flange 2020 extending transversely from the lower end of lower leg 2014. The base 2023 of the nailing hem 2012 is depicted with only one spur 2028. It should be noted that this spur differs from FIG. 4 in that the spur extends perpendicularly from the base in a forward direction 2006, and does not extend in the lower direction, and there is only one spur. However, multiple spurs could be used, and if desired the spur could also extend in the lower direction. A fastening means is illustrated here as a nail 2002 extending through the nailing hem 2012. The flange is useful in improving wind load performance of the overall panel, as well as increasing pull-out resistance (i.e. separation of the attachment member from the foam insulating layer).

Again, the foam insulating layer 2030 includes a front face 2032 which is spaced apart from a rear face 2034. A first end edge 2036 and a second end edge 2038 join the front face 2032 and the rear face 2034 at opposite ends of the foam insulating layer. The front face 2032, rear face 2034, first end edge 2036, and second end edge 2038 define a body 2040 of the foam insulating layer. The front face 2032 is angled with respect to the rear face 2034. Put another way, the thickness 2037 at the first end edge 2036 is less than the thickness 2039 at the second end edge 2038. The first end edge 2036 is planar (i.e. flat) from the front face 2032 to the rear face 2034. No joining element extends from the first end edge. The attachment member 2010 entirely covers the first end edge 2036 of the foam insulating layer. A groove 2042 is located in the second end edge 2038 of the foam insulating layer. The groove divides the body along the second end edge 2038 into a front ridge 2044 and a rear ridge 2046.

In this embodiment, the lower leg 2014 and the flange 2020 of the attachment member are embedded in the body 2040 of the foam insulating layer along the first end edge 2036. The nailing hem 2012 of the attachment member is substantially aligned with the rear face 2034 of the foam insulating layer.

The veneer panel 2050 has a front face 2052, a rear face 2054, a first end edge 2056, and a second end edge 2058. The veneer panel 2050 is attached to the front face 2032 of the foam insulating layer by its rear face 2054. The first end edge 2056 of the veneer panel extends transversely upwards beyond the first end edge 2036 of the foam insulating layer, so that the first end edge 2056 is adjacent the upper edge 2017 of the forward wall 2016. The lip 2026 caps the veneer panel 2050. In this regard, it should be noted that the forward wall 2016 of the attachment member depicted in FIG. 20 is slightly different from the forward wall 140 of the attachment member depicted in FIG. 4. In FIG. 4, the forward wall 140 is perpendicular to the main portion 110. Here in FIG. 20, the forward wall 2016 is angled, so that the forward wall 2016 is parallel to the front face 2032 of the foam insulating layer. Thus, the front face 2052 of the veneer panel can be flat.

The veneer panel 2050 includes a lower wall 2082 that extends transversely rearward from the second end edge 2058 of the veneer panel. The lower wall 2082 runs adjacent the front ridge 2044 on the second end edge of the foam insulating layer, and ends at the groove 2042. If desired, the lower wall could be part of a channel like that depicted in FIG. 12.

Again, the attachment member 2010 and the first end edge 2036 cooperate to be complementary in shape with the second end edge 2038 of the foam insulating layer, so that adjacent panels can engage each other. As seen in FIG. 22, the rear ridge 2046 fits into the attachment member 2010. The groove 2042 on the second end edge of the foam insulating layer is complementary to the forward wall 2016 of the attachment member, so that the forward wall 2016 and a portion of the veneer panel 2050 enter the groove 2042. A recess 2048 is present in the rear face 2034 of the foam insulating layer along the second end edge 2038 and is sized to accommodate the nailing hem 2012 of the attachment member. As a result, adjacent panels can engage each other.

More generally, the insulation panel 2000 could be described as being formed from an attachment member 2010, a foam insulating layer 2030, and a veneer panel 2050. The foam insulating layer has a front face 2032, a rear face 2034, a first end edge 2036, and a second end edge 2038 that define a body 2040 of the foam insulating layer. The attachment member 2010 comprises a main portion 2018 resting upon the first end edge 2036 of the foam insulating layer, a forward wall 2016 extending transversely from a forward edge of the main portion 2018 away from the foam insulating layer 2030, and a lower leg 2014 extending transversely from the main portion into the body 2040 of the foam insulating layer. The veneer panel 2050 is attached to the front face 2032 of the foam insulating layer, a first end edge 2056 of the veneer panel being adjacent to an upper edge 2017 of the forward wall 2016 of the attachment member.

Figure 23:
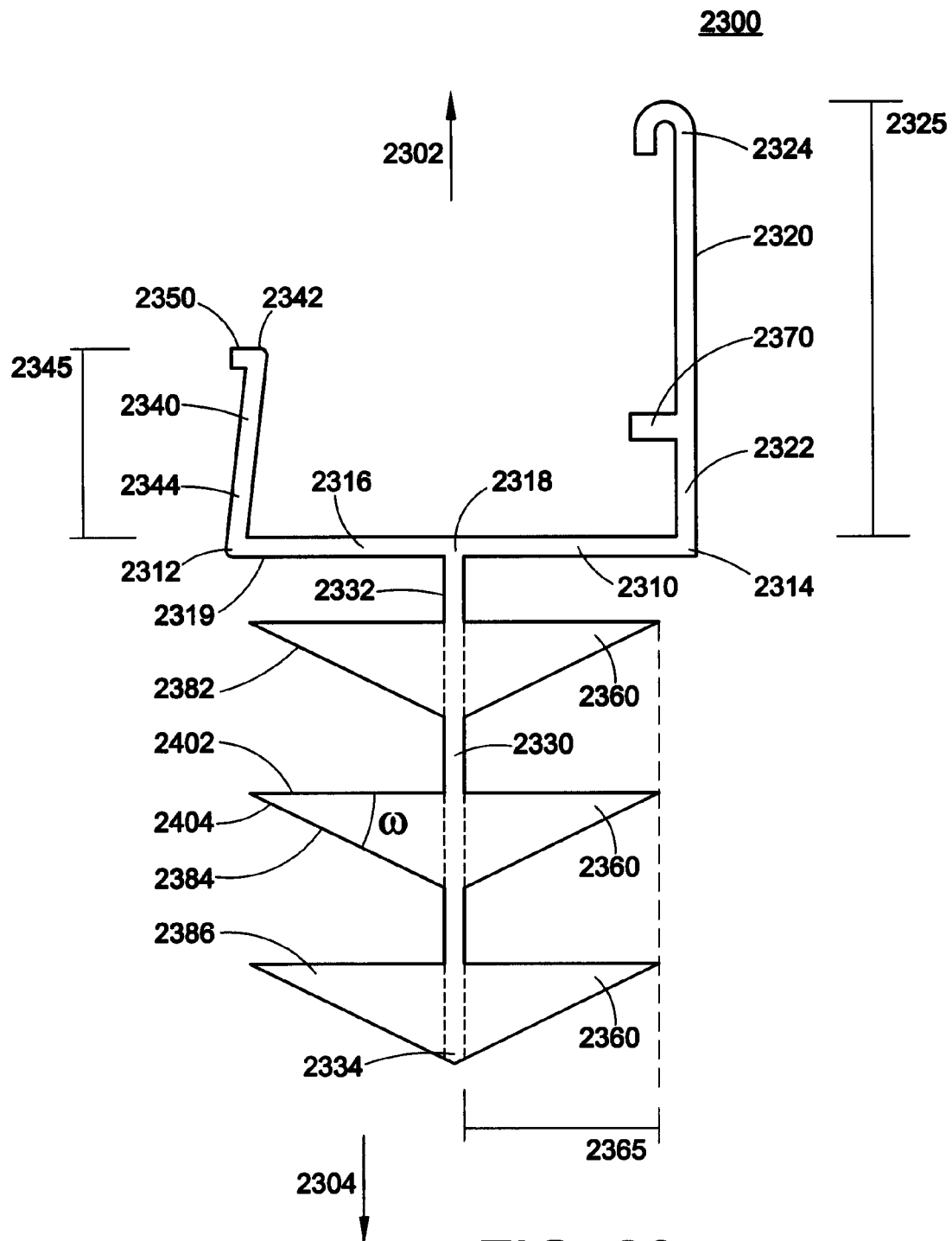
FIG. 23 is a side view of a fifth exemplary embodiment of an attachment member.
Figure 24:
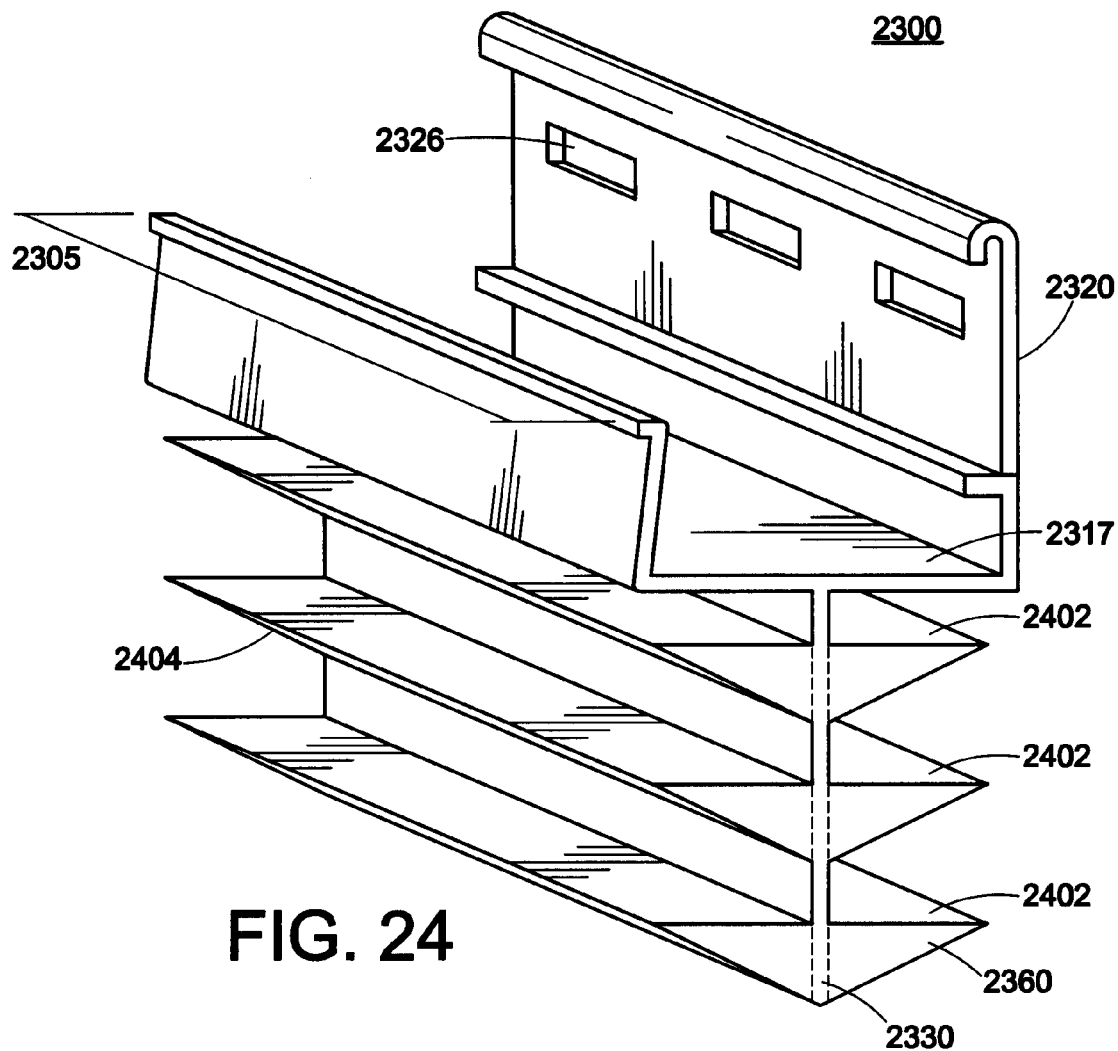
FIG. 24 is a perspective view of the attachment member of FIG. 23.

FIG. 23 is a side view of a variation on the attachment member which can apply to all embodiments described herein, including at least FIGS. 1-4. FIG. 24 is a perspective view. The attachment member 2300 has a main portion 2310, a hem portion or nailing hem 2320, and a lower leg 2330. The main portion 2310 of the attachment member has a forward edge 2312 and a rear edge 2314.

The hem portion 2320 extends transversely from the rear edge 2314 of the main portion in an upper direction (indicated by arrow 2302). The nailing hem 2320 has a base 2322 that connects to the main portion 2310, and an apex 2324 at the opposite end. The nailing hem also includes openings or receptacles 2326 (visible in FIG. 24) for fasteners. One spur 2370 extends from the base 2322 of the nailing hem. Again, these spurs extend only in the forward direction 2306, or put another way parallel to the main portion 2310, and do not extend in the lower direction 2304. Again, more than one spur may be present. The apex 2324 of the nailing hem here is rounded off.

The embodiment illustrated in FIG. 23 and FIG. 24 also includes a forward wall 2340, which has a first end 2342 and a second end 2344. It should be noted again that the forward wall is optional (as seen in FIG. 2). The second end 2344 of the forward wall connects to the main portion 2310 along the forward edge 2312. The first end 2342 can also be referred to as the upper edge of the first wall. The forward wall 2340 extends in the upper direction 2302 from the main portion 2310. As shown here, the lower leg 2330, the forward wall 2340, and the nailing hem 2320 may be substantially parallel to each other. Put another way, the lower leg 2330, the forward wall 2340, and the nailing hem 2320 extend substantially perpendicularly from the main portion 2310. Also, the height 2325 of the nailing hem is greater than the height 2345 of the forward wall. An optional lip 2350 may extend transversely from the first end or upper edge 2342 of the forward wall in the forward direction 2306.

The lower leg 2330 extends transversely from the main portion 2310 in a lower direction (indicated by arrow 2304). The upper direction 2302 is opposite the lower direction 2304. Described in another way, the connection portion 2310 joins the lower leg 2330 and the hem portion 2320 together. The lower leg 2330 has an upper or first end 2332, and a lower or second end 2334. The first end 2332 of the lower leg is connected to the main portion 2310. Here, the lower leg 2330 connects to the main portion 2310 in a central location 2316. Put another way, the lower leg 2330 connects to the main portion 2310 at a point between the forward edge 2312 and the rear edge 2314, such as the midpoint 2318 of the main portion.

In particular embodiments, the nailing hem 2320 and the lower leg 2330 extend substantially perpendicularly from the main portion 2310. Put another way, the hem portion 2320 and the lower leg 2330 are substantially parallel to each other.

The main variation illustrated here is in the shape of the lower leg 2330 and the flange(s) 2360 extending from the lower leg. As explained further below, one method of joining the attachment member to a foam insulating layer involves "stabbing" the foam insulating layer with the lower leg of the attachment member to fasten the two components together. The flange increases the pull-out resistance of the attachment member. However, the shape of the lower leg and the flange can both increase the ease of insertion and increase the pull-out resistance.

In the variation of FIG. 23 and FIG. 24, one or more flanges 2360 are present extending transversely from the lower leg 2330. Together, the lower leg 2330 and the flange(s) 2360 have the shape of an inverted tree. Put another way, the lower leg has an arboriform or dendriform shape. The lower leg 2330 can be thought of here as the "trunk". The flanges 2360 are the "branches" and have a pointed shape.

Each flange includes a stop surface 2402 and an angled surface 2404. The stop surface increases the difficulty of pulling the attachment member out of the foam insulating layer after insertion. The stop surface 2402 extends transversely from the lower leg 2330. The angled surface 2404 is angled with respect to the stop surface 2402, shown here as angle ω. Angle ω is acute and generally has a value of from about 15° to about 75°. The angled surface 2404 angles away from the main portion 2310 toward the lower end 2334 of the lower leg 2330. The angled surface eases the insertion of the attachment member into the foam insulating layer. The stop surface 2402 of each flange is closer to the main portion 2310 than the angled surface 2404. The stop surface is usually substantially parallel to the lower surface 2319 of the main portion 2310. However, the stop surface can also be angled with respect to the lower surface 2319 of the main portion as well.

At least one flange is present, but generally any number of flanges may be present. In FIG. 23, there are three flanges 2360, numbered here as tertiary flange 2382, secondary flange 2384, and primary flange 2386. The primary flange is located at the lower end 2334 of the lower leg 2330. The other flanges are spaced along the length of the lower leg. Put another way, the primary flange is further from the main portion than the other flanges. The lower end 2334 itself is pointed. Dotted lines are present in FIG. 23 to show the difference between the lower leg 2330 and the flanges 2360.

As seen in the embodiment of FIG. 23, the stop surface 2402 has a length 2365. In FIG. 23, the stop surfaces of all three flanges 2382, 2384, 2386 have the same length.

FIG. 24 is a perspective view of the attachment member of FIG. 23. The receptacles 2326 in the nailing hem 2320 are visible. The upper surface 2317 of the main portion is flat. The stop surfaces 2402 on each flange 2360 are also flat. The attachment member may have any desired length 2305.

Figure 25:
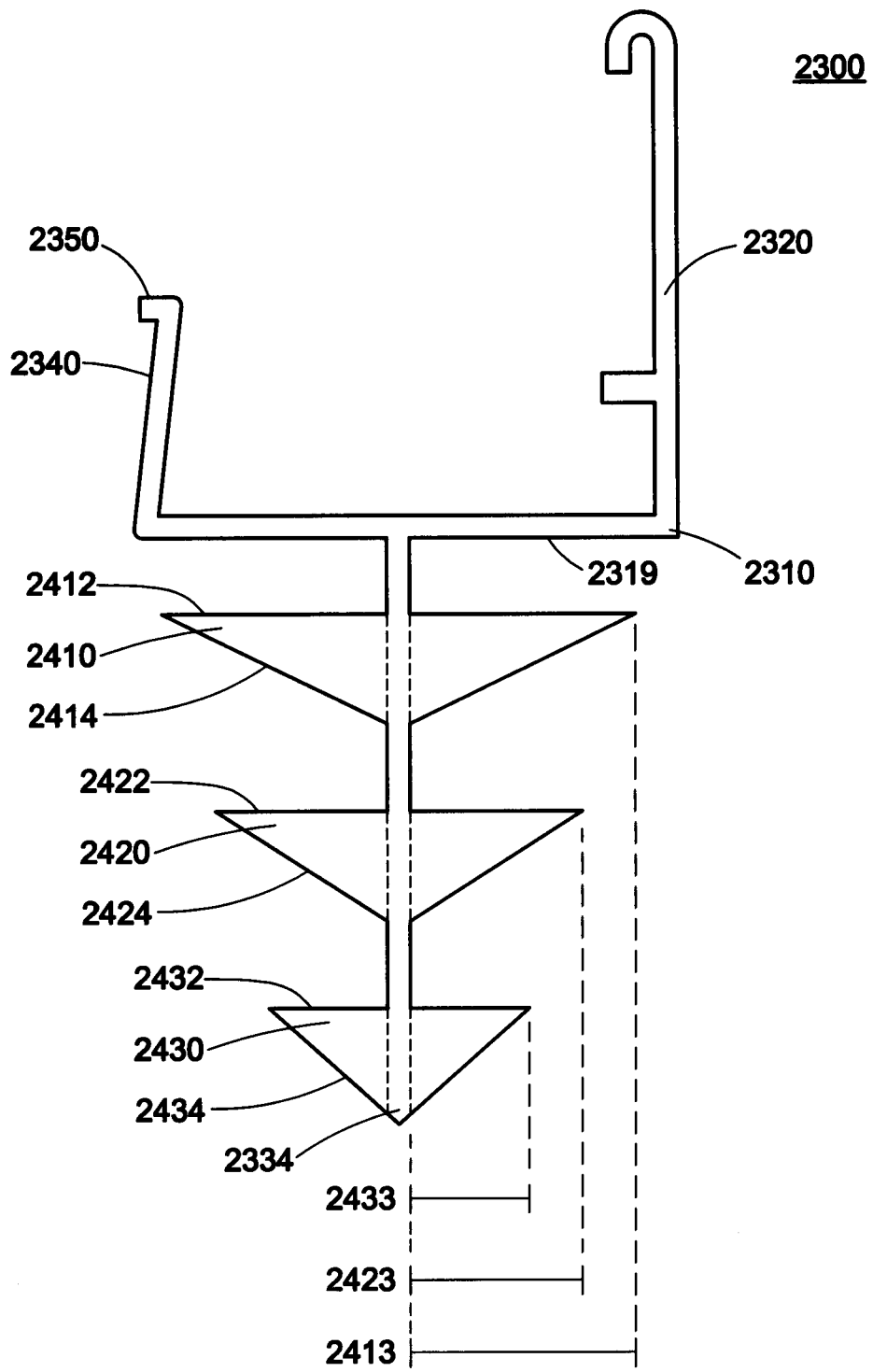
FIG. 25 is a side view of a variation on the attachment member of FIG. 23.

FIG. 25 depicts a different embodiment in which the stop surfaces of different flanges have different lengths. In FIG. 25, there are three flanges numbered here as tertiary flange 2410, secondary flange 2420, and primary flange 2430. Tertiary flange 2410 has a stop surface 2412 and an angled surface 2414. The tertiary stop surface 2412 has a tertiary length 2413. Secondary flange 2420 has a stop surface 2422 and an angled surface 2424. The secondary stop surface 2422 has a secondary length 2423. Primary flange 2430 has a stop surface 2432 and an angled surface 2434. The primary stop surface 2432 has a primary length 2433. The lengths 2413, 2423, 2433 of the stop surfaces are measured from the lower leg 2330 parallel to the lower surface 2319 of the main portion 2310.

Tertiary length 2413 is greater than both secondary length 2423 and primary length 2433. Secondary length 2423 is less than tertiary length 2413 and greater than primary length 2433. Primary length 2433 is less than both tertiary length 2413 and secondary length 2423. In other words, the tertiary flange is longer than the secondary flange, which is longer than the primary flange. Generally, a flange which is relatively closer to the main portion 2310 should have a stop surface whose length is greater than that of a flange which is relatively further from the main portion 2310.

Referring to FIG. 18 though applying to all embodiments, the foam insulating layer generally has a thickness of from about 1.0 inches to about 4.0 inches, with the thickness varying if the foam insulating layer is contoured. This thickness may be measured along the first end edge (reference numeral 1837) or along the second end edge (reference numeral 1839). The foam insulating layer may have a height 1805 of from about 8 inches to about 48 inches, as desired. In some embodiments, the height 1805 is from about 12 inches to about 24 inches.

The attachment member is typically made from a polymeric material known in the art. The attachment member is typically made by injection processes where the polymeric material is melted and injected into a die mold. The polymeric material is then cooled and removed from the die mold.

The veneer panel and the attachment member can be attached to the insulating layer in a variety of ways including, but not limited to, adhesive, chemical bonding, interlocking complementary surfaces, and/or fasteners. Typically, however, adhesives are used. The adhesive may be used over the entire surface of the veneer panel or the attachment member, or used in discrete locations. Suitable adhesives may include, but are not limited to, UV curable adhesives and hot melt adhesives, such as polyamines and urethanes, glue, thermosetting or thermoplastic adhesives, pressure sensitive adhesives or solvent-based adhesives.

At least three ways of attaching the attachment member to the foam insulating layer are contemplated. First, the foam insulating layer is made with the first end edge containing a channel, and the lower leg of the attachment member is slid into the channel from the side. Second, the foam insulating layer is made without a channel in the first end edge, and the attachment member may be pressed or stabbed into the foam insulating layer and adhered in place. Third, the attachment member may be embedded in the foam insulating layer during the shape molding process, as described further below. The attachment member may be located to allow the insulation panel to be fastened to the wall without creating penetrations in the veneer panel or the foam insulating layer.

The foam insulating layer may be shape molded. Such molding operations will generally impart the desired contours and/or design to the foam insulating layer. Typically, beads and/or pellets of a polymeric precursor material, such as pre-expanded polystyrene, are placed in a suitably configured die mold, then reacted in the presence of water and heat (i.e. steam) to expand during the reaction process. The polymeric precursor material expands and presses against the die surface to form compressed, elongated closed calls that form a characteristic tough smooth skin. The shape molded process produces a panel that is essentially straight and/or free of camber. It is contemplated that the attachment member can be placed in the die mold prior to the expansion of the polymeric precursor material. This embeds the attachment member into the foam insulating layer as the polymeric material is expanded, such that no secondary fasteners are needed.

The foam insulating layer provides structural integrity to the insulated siding panel. For example, the foam insulating layer is the platform to which the veneer panel and the attachment member are connected. The foam insulating layer may be shaped to provide the desired profile for the overall insulated siding panel. For example, the shape of the foam insulating layer may be obtained by either suitable shaping of the die mold, or by computer numerical control (CNC) cutting. The grooves and/or female attachment members may also be milled or wire-cut.

The foam insulating layer is generally made from a cellular foam product, i.e. a plastic or polymeric material with numerous cells of trapped air distributed throughout its mass. For example, expanded polystyrene (EPS) is a cellular foam plastic made from beads of polystyrene that are first pre-expanded and allowed to rest for a suitable interval, then molded in closed steam-heated shaped molds to produce closed-cell molded foams. The size and density of the closed cells can be controlled and may vary depending upon the application. Suitable materials for the foam insulating layer can include extruded polystyrene (XPS), expanded polystyrene (EPS), polyurethane, polyisocyanurate, polyethylene, polypropylene, or combinations thereof. In some embodiments, the foam insulating layer is made from a rigid foam material.

The foam insulating layer can be of any density desired, or be tuned to provide different densities depending on the location. For example, it may be desirable to have higher densities near the edges of the panel, and lower densities near the center (where the veneer panel covers the foam insulating layer). In particular embodiments, the foam insulating layer has a higher density along the first end edge or upper edge than in the center of the foam insulation layer (i.e. the middle region of the foam insulation layer between the first end edge and the second end edge). Similarly, the foam insulation layer may also have a higher density along the second end edge or lower edge than in the center of the foam insulation layer. In other words, the foam insulation layer may be thought of as having a top region, a bottom region, and a middle region, and the middle region has a lower foam density than at least one of the top region and the bottom region, and possibly both the top and bottom regions. This increased foam density can strengthen the joining areas of the foam insulation layer.

Expanded or extruded polystyrene are particularly desirable materials for the foam insulation layer because they provide a solid feel; improve the R-value; deaden noise transmitted through the panel; and allow moisture to migrate away from the exterior wall into the external environment, protecting the exterior wall behind the foam insulation layer and reducing the risk of mold growth.

The veneer panel is optional and is not present in all embodiments, but is generally desired. The veneer panel provides environmental resistance and durability. It is contemplated that the veneer panel is generally contoured to conform to the contours of the foam insulating layer. Generally, siding must be thick to resist sagging and retain the desired shape. However, the foam insulating layer allows the veneer panel to be thinner than otherwise necessary. The veneer panel only has to provide weatherability to the composite siding panel. Whereas traditional vinyl veneer sidings have a minimum material thickness of 0.040 inches, the veneer panels used in this disclosure may have a thickness of from 0.020 to 0.036 inches.

The veneer panel can be formed from any suitable polymeric, metallic, cementitious, or composite material. Exemplary materials include vinyl, polypropylene, fiber-cement material, polyolefins, polyvinyls, polycarbonates, polyacetals, polysulfones, polyesters, polyamides, multilayer films, polyethylene including high density polyethylene (HDPE) and low density polyethylene (LDPE), polypropylene, CPVC ABS, ethyl-vinyl acetate, various extruded ionomeric films, polyethylene-based films, wood, or combinations thereof. Other siding materials suitable for the veneer panel include wood, aluminum, and steel.

If desired, the rear face of the foam insulating layer may also have drainage grooves formed or fabricated into it. Such grooves are described in U.S. Patent Publication Nos. 2005/0081468 and 2007/0175154, the disclosures of which are hereby fully incorporated by reference.

The insulation panels are used in suitable combinations to be affixed to or attached to exterior walls of a building. They can be used on several types of structures including, but not limited to, wood-frame, cement block, structural insulated panels (SIPS), insulating concrete forms (ICFs), steel studs, etc. When installed, the resulting insulating layer is uniform and forms a complete seal. In addition, any perforations in the wall are sealed off from outside elements by the insulation. The attachment member also provides fewer perforations overall in the exterior wall. The foam insulating layer and veneer panels themselves are not perforated either. Nails, screws, or staples can be used with equal ease and can be more accurately placed and more secure because they are applied directly to the exterior wall instead of through a flexible insulating layer.

Other benefits of the insulation panels described herein relate to production. The amount of insulation can be increased by simply adding more foam, without any other cost in materials. A single foam insulation layer can be used with multiple veneer panels to provide desired assemblies. The veneer panel can be reduced in thickness, thereby reducing waste.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An attachment member comprising:
   a main portion having a forward edge and a rear edge;
   a nailing hem extending transversely from the rear edge of the main portion in an upper direction, the nailing hem having openings through which a fastener can be inserted;
   a forward wall extending from the forward edge of the main portion in the upper direction, wherein a height of the nailing hem is greater than a height of the forward wall;
   a lip extending transversely from an upper edge of the forward wall in a forward direction away from the nailing hem;
   a lower leg extending transversely from a central location of the main portion in a lower direction, the lower leg having opposing first and second ends, wherein the lower leg is connected to the main portion at the first end of the lower leg; and
   a primary flange extending transversely from the lower leg, the primary flange located along the lower leg closer to the second end than the first end of the lower leg.

2. The attachment member of claim 1, wherein the lower leg and the nailing hem are substantially parallel to each other and extend substantially perpendicularly from the main portion.

3. The attachment member of claim 1, wherein a base of the nailing hem further comprises at least one spur extending transversely in the lower direction and in the forward direction.

4. The attachment member of claim 1, further comprising a secondary flange extending transversely from the lower leg, wherein the primary flange is located along the lower leg further from the main portion than the secondary flange, and wherein the secondary flange is longer than the primary flange.

5. The attachment member of claim 4, wherein at least one of the flanges has a stop surface and an angled surface that extends away from the main portion.

6. An insulation panel comprising:
   a foam insulating layer comprising a front face, a rear face, a first end edge, and a second end edge that define a body of the foam insulating layer; and
   an attachment member comprising:
      a main portion having a forward edge and a rear edge;
      a nailing hem extending transversely from the rear edge of the main portion in an upper direction; and
      a lower leg extending transversely from the main portion in a lower direction at a point between the forward edge and the rear edge;
   wherein the lower leg of the attachment member extends into the body of the foam insulating layer along the first end edge, the attachment member and the first end edge cooperating to be complementary in shape with the second end edge such that adjacent panels can engage each other.

7. The insulation panel of claim 6, further comprising a veneer panel attached to the front face of the foam insulating layer, the veneer panel having a first end edge at the same end of the insulation panel as the first end edge of the foam insulating layer and a second end edge.

8. The insulation panel of claim 7, wherein the veneer panel has a second wall that extends rearward along the second end edge of the foam insulating layer.

9. The insulation panel of claim 7, wherein the first end edge of the veneer panel extends beyond the first end edge of the foam insulating layer.

10. The insulation panel of claim 9, wherein the attachment member further comprises a forward wall extending transversely from the forward edge of the main portion in the upper direction, and the first end edge of the veneer panel extends to an upper edge of the forward wall.

11. The insulation panel of claim 10, wherein the second end edge of the foam insulating layer comprises a groove complementary to the forward wall of the attachment member.

12. The insulation panel of claim 6, wherein the foam insulating layer further comprises a recess in the rear face; and wherein the recess is shaped to accommodate the nailing hem.

13. The insulation panel of claim 6, wherein the second end edge of the foam insulating layer is thicker than the first end edge of the foam insulating panel.

14. The attachment member of claim 6, wherein a base of the nailing hem connecting to the main portion is thicker than an apex of the nailing hem.

15. An insulation panel comprising an attachment member, a foam insulating layer, and a veneer panel;
   wherein the attachment member comprises:
      a main portion having a forward edge and a rear edge;
      a nailing hem extending transversely from the rear edge of the main portion in an upper direction;
      a spur extending in a forward direction from a base of the nailing hem;
      a forward wall extending transversely from the forward edge of the main portion in the upper direction;
      a lip extending transversely from an upper edge of the forward wall in a forward direction;
      a lower leg extending transversely from the main portion in a lower direction; and
      a flange extending transversely from a lower end of the lower leg;
   wherein the foam insulating layer comprises:
      a front face, a rear face, a first end edge, and a second end edge that define a body of the foam insulating layer;
      a recess in the rear face of the foam insulating layer that is shaped to accommodate the nailing hem of the attachment member;
      wherein the front face is angled with respect to the rear face and the forward wall of the attachment member is angled to be parallel with the front face of the foam insulating layer; and
      wherein a groove in the second end edge forms a front ridge and a rear ridge in the second end edge;
   wherein the veneer panel comprises a front face, a rear face, a first end edge, a second end edge, and a lower wall extending rearwards from the second end edge, the lower wall running adjacent to the front ridge of the foam insulating layer and ending at the groove;
   wherein the lower leg of the attachment member extends into the body of the foam insulating layer along the first end edge, the attachment member and the first end edge of the foam insulating layer cooperating to be complementary in shape with the second end edge of the foam insulating layer such that adjacent panels can engage each other; and
   wherein the veneer panel is attached to the front face of the foam insulating layer.

\* \* \* \* \*